United States Patent
Sakai

(10) Patent No.: US 7,414,645 B2
(45) Date of Patent: Aug. 19, 2008

(54) IMAGE FORMING APPARATUS WITH SCANNING LENS

(75) Inventor: Toshio Sakai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 357 days.

(21) Appl. No.: 11/235,315

(22) Filed: Sep. 27, 2005

(65) Prior Publication Data

US 2006/0066712 A1    Mar. 30, 2006

(30) Foreign Application Priority Data

Sep. 27, 2004   (JP)   ............... 2004-280540

(51) Int. Cl.
*B41J 15/14*   (2006.01)
*B41J 27/00*   (2006.01)

(52) U.S. Cl. ...................... 347/244; 347/258

(58) Field of Classification Search ............... 347/230, 347/241–244, 256–258, 263, 255; 359/205–210, 359/642, 214–215; 358/1.1
See application file for complete search history.

(56) References Cited

U.S. PATENT DOCUMENTS 5,953,042 A * 9/1999 Nabeta et al. ............... 347/263

6,452,687 B1 * 9/2002 Suzuki et al. ............... 358/1.1
2005/0152045 A1 * 7/2005 Honda ........................ 359/642

FOREIGN PATENT DOCUMENTS

| JP | 09033846 A | * | 2/1997 |
| JP | 2001091879 | | 4/2001 |
| JP | 2001194613 A | * | 7/2001 |

* cited by examiner

*Primary Examiner*—Hai C Pham
(74) *Attorney, Agent, or Firm*—Banner & Witcoff, Ltd.

(57) ABSTRACT

An image forming apparatus includes a photosensitive member and a scanning lens. The photosensitive member bears a latent image thereon and defines a main scanning direction. The scanning lens transmits a light beam scanningly deflected in the main scanning direction for exposing the photosensitive member to the light beam to form the latent image thereon. The scanning lens includes a lens body and a rib. The lens body is formed of resin and extends substantially in the main scanning direction. The lens body defines a sub-scanning direction perpendicular to the main scanning direction. The lens body has opposite surfaces that are both substantially perpendicular to the sub-scanning direction. The rib is formed integrally with the lens body and protrudes in the sub-scanning direction from either one of the opposite surfaces. The rib extends over a predetermined range in the main scanning direction.

17 Claims, 15 Drawing Sheets

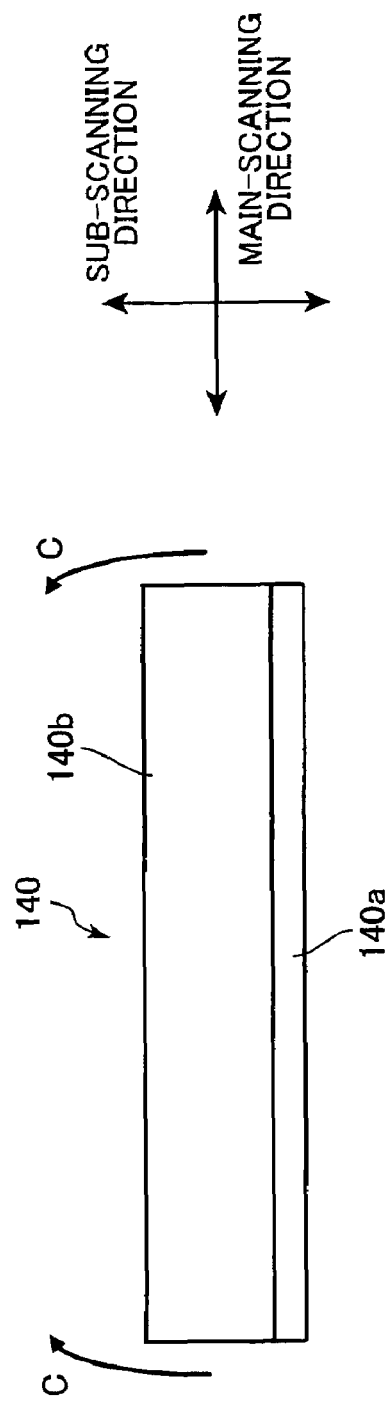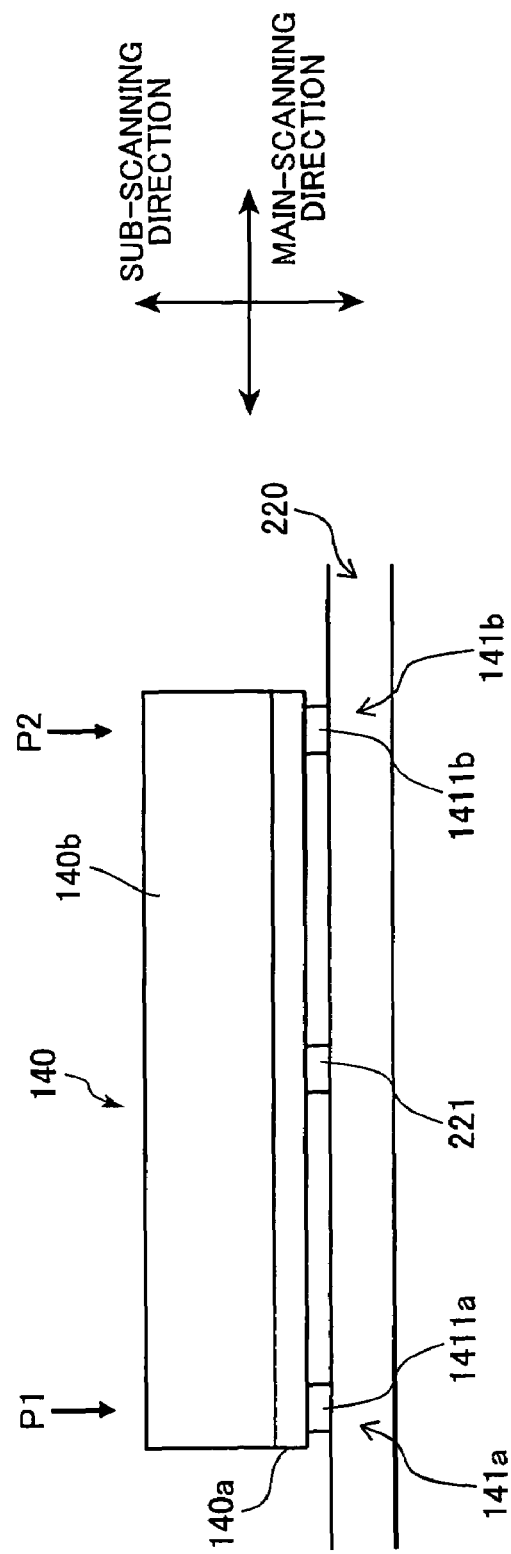

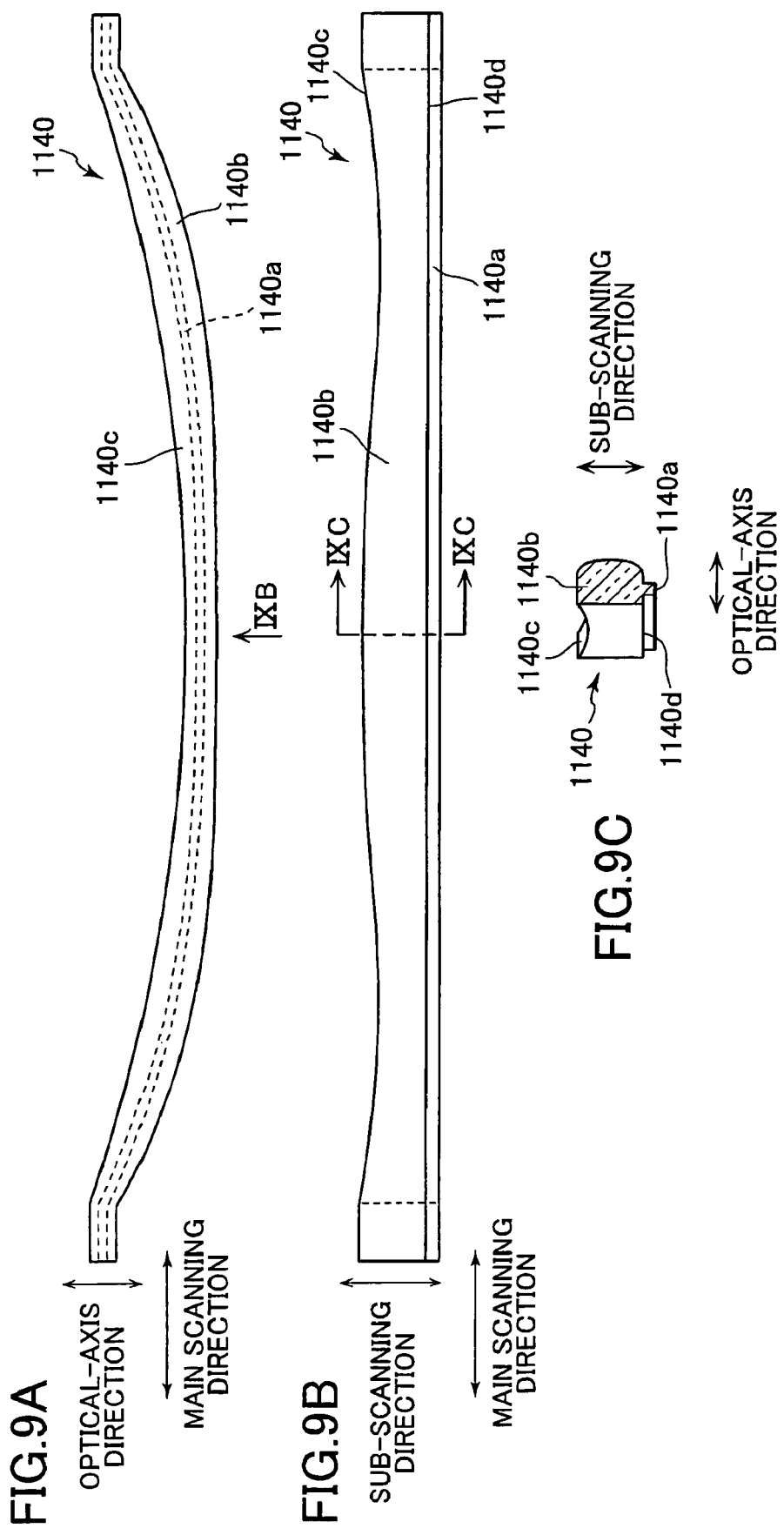

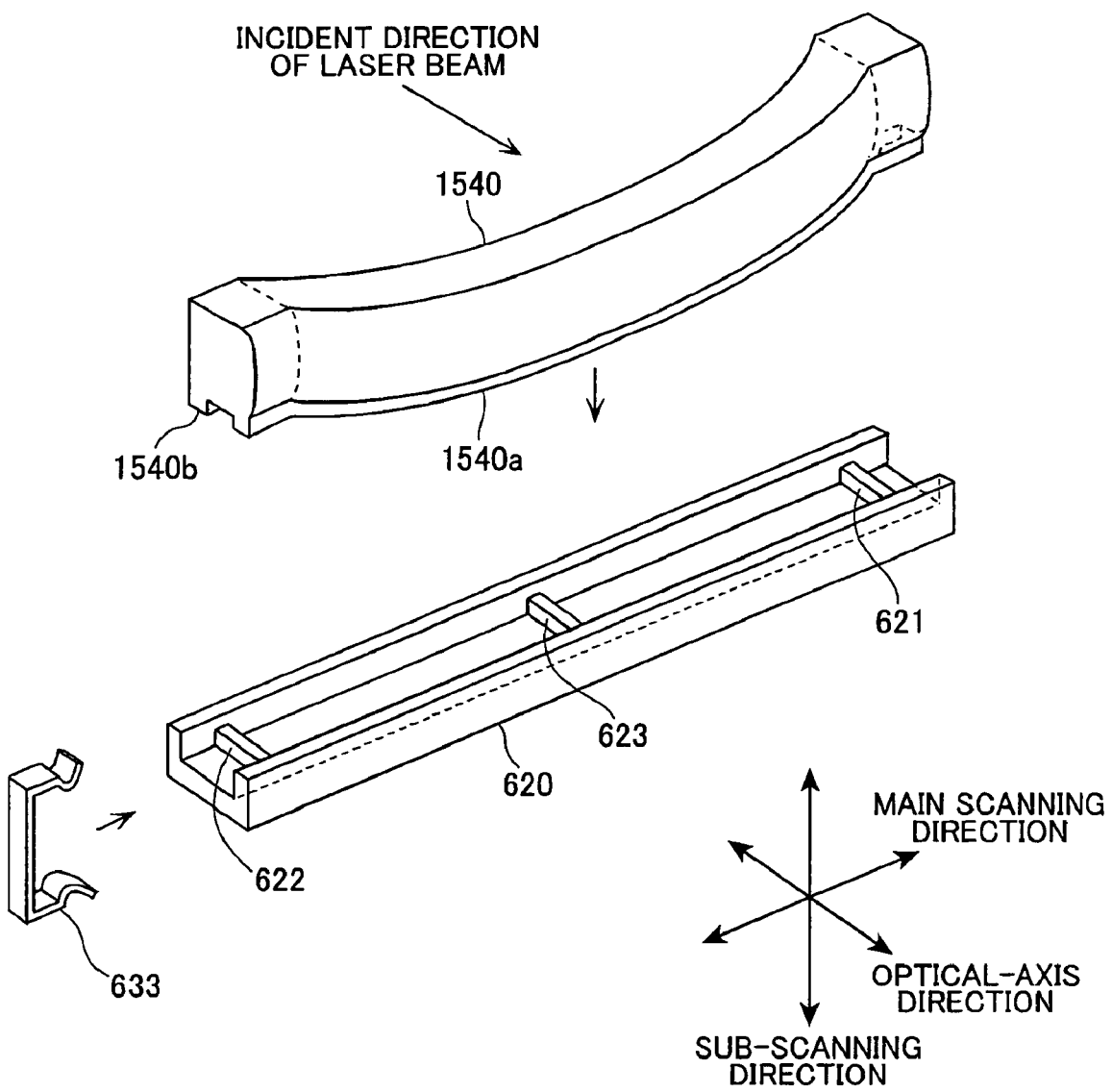

IMAGE FORMING APPARATUS WITH SCANNING LENS

BACKGROUND OF THE INVENTION

1. Field of the Invention

The present invention relates to an image forming apparatus, a color image forming apparatus, a scanning unit, and a scanning lens. The present invention particularly relates to an image forming apparatus and a color image forming apparatus having a resinous scanning lens through which a light beam deflected in a main scanning direction passes; a scanning unit for emitting a light beam and scanning the light beam over a scanning target; and a scanning lens employed in the scanning unit.

2. Description of Related Art

In a laser printer or other electrophotographic image forming apparatus, a light source such as a semiconductor laser emits a light beam that is deflected by a polygon mirror or other deflector onto a photosensitive member, the surface of which has a uniform charge, so as to form an electrostatic latent image on the surface of the photosensitive member by scanning the light beam thereon. The latent image is subsequently developed into a visible image with toner, and the toner image is transferred onto a recording medium, such as a sheet of paper, to form an image on the recording medium.

This kind of conventional image forming apparatus has a scanning unit for irradiating the light beam on the surface of the photosensitive member. The scanning unit is often configured of a light-emitting unit such as a semiconductor laser for emitting the light beam, a deflector such as a polygon mirror for scanningly deflecting the light beam in a main scanning direction, a first scanning lens such as an fθ lens for converging the light beam in the main scanning direction, and a second scanning lens such as a cylindrical lens for converging the light beam in a sub-scanning direction perpendicular to the main scanning direction. These components may be mounted on a unit frame formed of synthetic resin, for example.

While scanning lenses such as the fθ lens and the cylindrical lens were conventionally formed of glass, many of these lenses are now being formed of a synthetic resin material due to the low manufacturing cost and the ease with which such lenses can be mass produced in metallic molds, even lenses with complex curvatures.

Lenses made of a synthetic resin material are often not produced in the ideal shape defined by the molds and may be deform slightly during production due to a non-uniform temperature distribution in the mold, uneven cooling, and the like. Cylindrical lenses and other scanning lenses formed of synthetic resin are particularly susceptible to warping in the longitudinal direction. A technique designed to correct this warpage has been disclosed in Japanese patent-application publication No. 2001-91879.

SUMMARY

There has been considerable demand for more compact laser printers and other image forming apparatuses as a convenience to home users, many of whom have limited space, such as a desktop, in which to install their printer. However, the technology described in Japanese patent-application publication No. 2001-91879 requires a large vertical moving mechanism and upper surface contact member for correcting warpage in the scanning lenses, which runs counter to these demands for a more compact image forming apparatus.

In view of the foregoing, it is an object of the present invention to provide an image forming apparatus, a color image forming apparatus, a scanning unit, and a scanning lens that can be made more compact due to a simplified construction for correcting warpage in scanning lenses formed of resin.

In order to attain the above and other objects, according to one aspect, the present invention provides an image forming apparatus. The image forming apparatus includes a photosensitive member and a scanning lens. The photosensitive member bears a latent image thereon and defines a main scanning direction. The scanning lens transmits a light beam scanningly deflected in the main scanning direction for exposing the photosensitive member to the light beam to form the latent image thereon. The scanning lens includes a lens body and a rib. The lens body is formed of resin and extends substantially in the main scanning direction. The lens body defines a sub-scanning direction perpendicular to the main scanning direction. The lens body has opposite surfaces that are both substantially perpendicular to the sub-scanning direction. The rib is formed integrally with the lens body and protrudes in the sub-scanning direction from either one of the opposite surfaces. The rib extends over a predetermined range in the main scanning direction.

According to another aspect, the present invention provides a color image forming apparatus for forming color images on a recording medium by superposing images in a plurality of colors. The apparatus includes at least one photosensitive member and a plurality of scanning lenses. The at least one photosensitive member includes either a plurality of separate photosensitive members or a single photosensitive member having separate regions. The at least one photosensitive member is exposed by a plurality of light beams corresponding to the plurality of colors for forming latent images either on the plurality of separate photosensitive members or on the separate regions of the single photosensitive member. The at least one photosensitive member defines a main scanning direction. The plurality of scanning lenses is each provided for a corresponding one of the plurality of colors. Each scanning lens transmits a corresponding one of the plurality of light beams scanningly deflected in the main scanning direction for exposing the at least one photosensitive member to the light beams to form the latent images thereon. Each scanning lens includes a lens body and a rib. The lens body is formed of resin and extends substantially in the main scanning direction. The lens body defines a sub-scanning direction perpendicular to the main scanning direction. The lens body has opposite surfaces that are both substantially perpendicular to the sub-scanning direction. The rib is formed integrally with the lens body and protrudes in the sub-scanning direction from either one of the opposite surfaces. The rib extends over a predetermined range in the main scanning direction.

According to another aspect, the present invention provides a scanning unit. The scanning unit includes a light emitting portion, a deflector, a first scanning lens, and a second scanning lens. The light emitting portion emits a light beam. The deflector scanningly deflects the light beam in a main scanning direction. The first scanning lens converges the light beam with regard to the main scanning direction. The second scanning lens converges the light beam with regard to a sub-scanning direction perpendicular to the main scanning direction. The second scanning lens includes a lens body and a rib. The lens body is formed of resin and extends substantially in the main scanning direction. The lens body has opposite surfaces that are both substantially perpendicular to the sub-scanning direction. The rib is formed integrally with the lens body and protrudes in the sub-scanning direction from either one of the opposite surfaces. The rib extends over a predetermined range in the main scanning direction.

According to another aspect, the present invention provides a scanning lens. The scanning lens includes a lens body and a rib. The lens body is formed of resin and extends substantially in a longitudinal direction. The lens body defines a height direction perpendicular to the longitudinal direction. The lens body has opposite surfaces that are both substantially perpendicular to the height direction. The rib is formed integrally with the lens body and protrudes in the height direction from either one of the opposite surfaces. The rib extends over a predetermined range in the longitudinal direction.

BRIEF DESCRIPTION OF THE DRAWINGS

The above and other objects, features and advantages of the invention will become more apparent from reading the following description of the embodiments taken in connection with the accompanying drawings in which:

FIG. 8A is an explanatory diagram illustrating direction in which warpage in the cylindrical lens occurs;

FIG. 8B is an explanatory diagram illustrating how warpage in the cylindrical lens is corrected when the cylindrical lens is fixed to the base frame;

FIG. 9A is an explanatory diagram showing another example of a cylindrical lens, as viewed from the side in a sub-scanning direction opposite the side on which a rib is provided;

FIG. 9B is an explanatory diagram showing the cylindrical lens of FIG. 9A, as viewed from a direction indicated by an arrow IXB in FIG. 9A;

FIG. 9C is a cross-sectional view of the cylindrical lens along a line IXC-IXC in FIG. 9B;

FIG. 15 is a perspective view showing a cylindrical lens and a mounting member according to a modification.

DETAILED DESCRIPTION OF THE EMBODIMENTS

Figure 1:
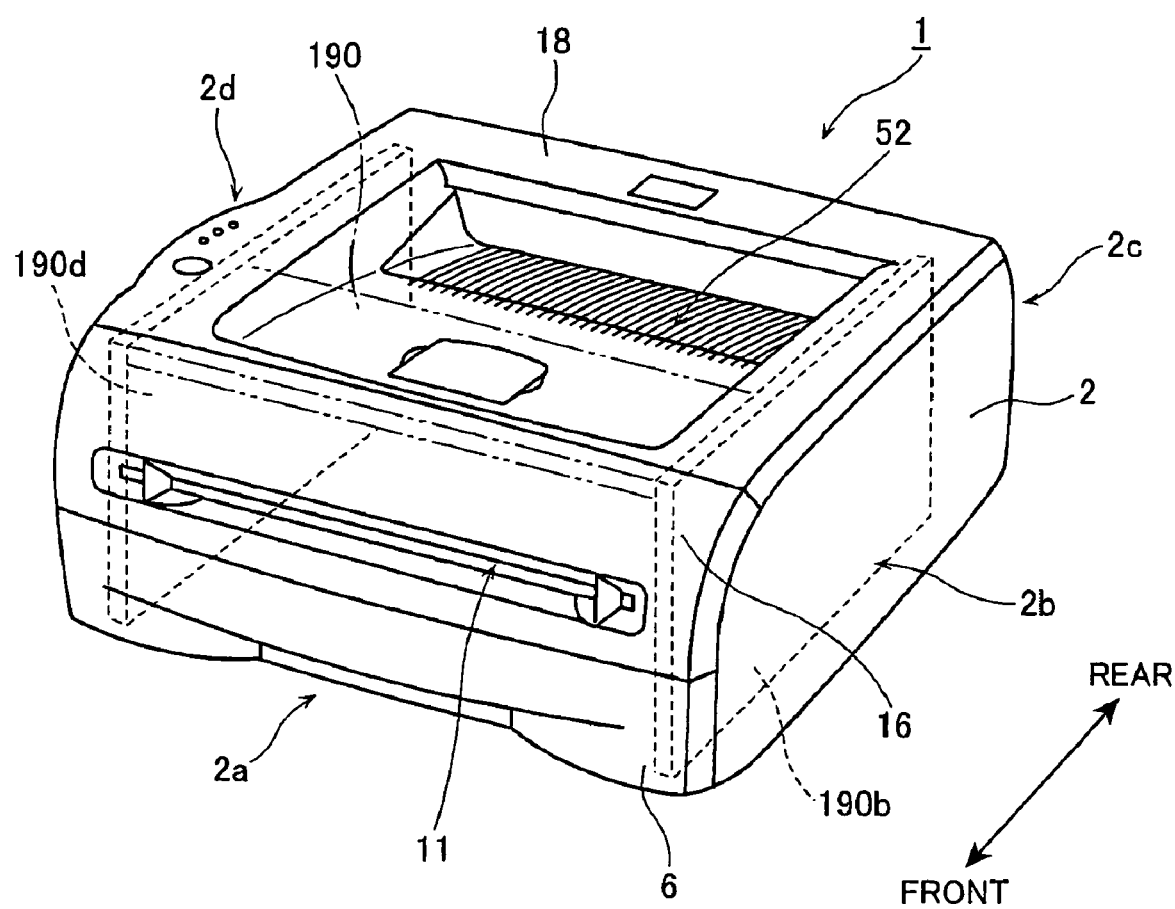
FIG. 1 is a perspective view showing the exterior of a laser printer according to a first embodiment of the present invention.

An image forming apparatus, a color image forming apparatus, a scanning unit, and a scanning lens according to embodiments of the present invention will be described while referring to the accompanying drawings wherein like parts and components are designated by the same reference numerals to avoid duplicating description.

In the following description, the expressions "front" and "rear" are used to define the various parts when the image forming apparatus or the color image forming apparatus is disposed in an orientation in which it is intended to be used.

An image forming apparatus according to a first embodiment of the present invention will be described while referring to FIGS. 1 through 8.

(1) Overall Construction of a Laser Printer

FIG. 1 is a perspective view showing the exterior of a laser printer 1. As shown in FIG. 1, the laser printer 1 includes a casing 2 having a top cover 18 forming the top wall of the casing 2, and four side walls 2a, 2b, 2c, and 2d including front side wall 2a and rear side wall 2c (side walls 2c and 2d are not visible in FIG. 1). A portion of the top cover 18 is depressed (recessed) toward inside the casing 2 to form a sheet discharge tray 72. A paper supply cassette 6 is provided in the bottom section of the casing 2 and can be inserted into or removed from the casing 2 via the front side wall 2a. The paper supply cassette 6 can accommodate a plurality of sheets of a paper or other recording medium. The front side wall 2a also includes a front cover 16 that is swingably open or closed on the front of the casing 2, and a manual feed tray 11 disposed on the front cover 16 for hand-feeding a recording medium one sheet at a time.

As shown in broken lines and two-dot chain lines in FIG. 1, the laser printer 1 also includes a pair of side frames 190b and 190d arranged parallel to each other and inside the opposing side walls 2b and 2d; and a rigid plate 190 formed of a steel sheet or the like that spans between the side frame 190b and side frame 190d beneath the top cover 18. The side frames 190b and 190d are formed of steel plates or a molded synthetic resin, such as polystyrene or ABS. A scanning unit (not shown in FIG. 1) is fixed to the bottom surface of the rigid plate 190 as will be described later.

Figure 2:
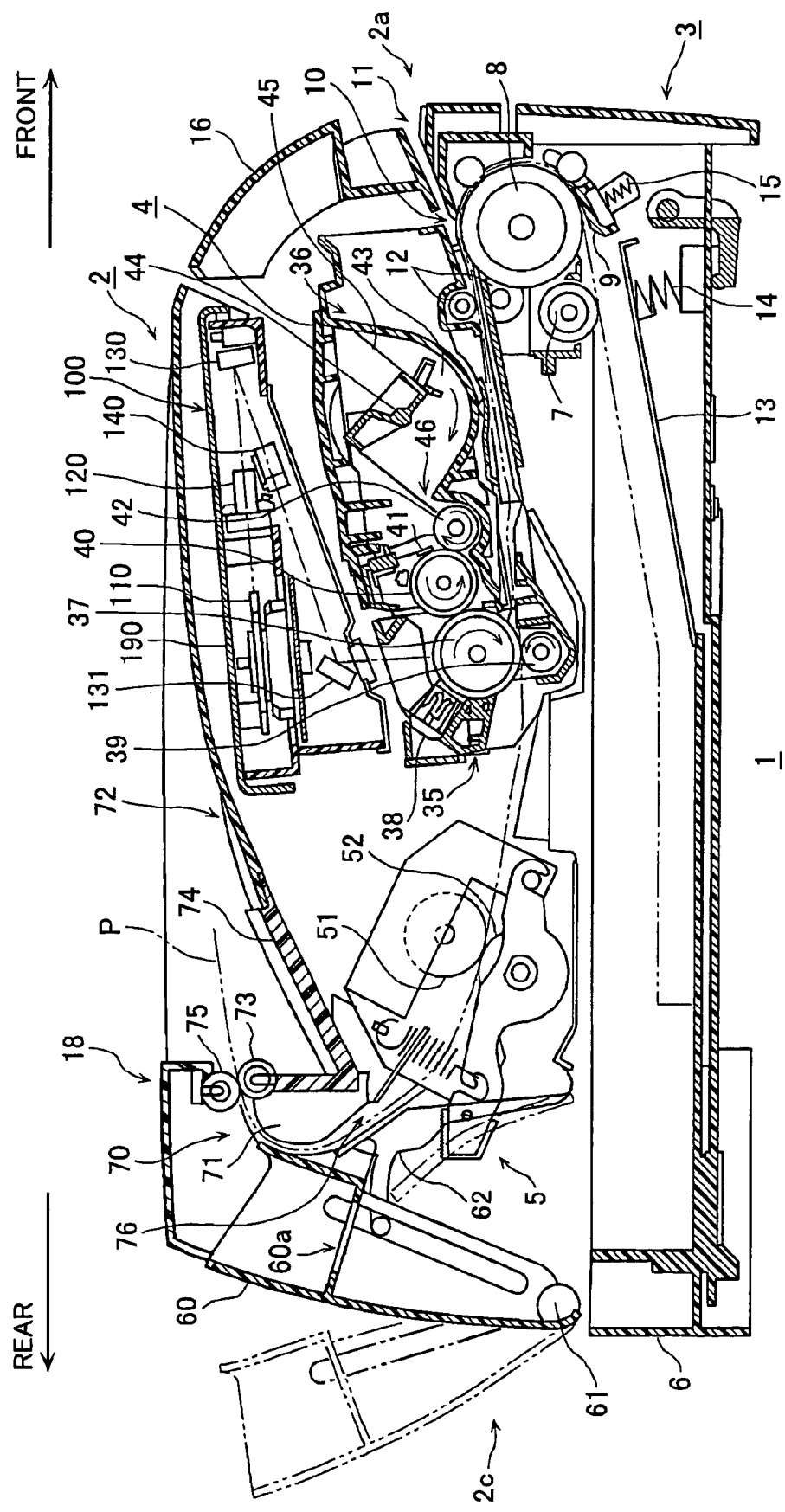
FIG. 2 is a vertical cross-sectional view of the laser printer in FIG. 1.

Next, the construction of the laser printer 1 will be described in greater detail with reference to the FIG. 2. FIG. 2 is a vertical cross-sectional view of the laser printer 1 viewed from the side wall 2d side. The laser printer 1 includes the casing 2 having the top cover 18, the front cover 16 provided on the front side wall 2a, and a rear cover 60 provided on the rear side wall 2c. Also accommodated in the casing 2 are a paper feed unit 3 for supplying a paper or other recording medium (a conveying path along which the recording medium is conveyed is represented by a two-dot chain line P); a process cartridge 4 for forming visible toner images on the paper conveyed from the paper feed unit 3; a fixing unit 5 for fixing the toner image to the paper; and a paper discharge unit 70 for discharging the paper after the paper has passed through the fixing unit 5. In the following description, the side wall of the casing 2 on which the front cover 16 is provided is the front side wall 2a, while the side wall opposing the front side wall 2a is the rear side wall 2c.

The paper feed unit 3 includes the paper supply cassette 6; and feeding rollers 7 and 8, and a separating pad 9 disposed above the leading edge of the paper stacked in the paper supply cassette 6 with respect to the paper conveying direction (the front side of the laser printer 1). A paper feeding path 10 is formed by the paper feed unit 3 for turning the direction of the sheets of paper fed from the paper supply cassette 6 and conveying the paper along the bottom of the process cartridge 4. A pair of registration rollers 12 is provided on the paper feed unit 3 and straddle the paper feeding path 10. Whether the paper is fed onto the paper feeding path 10 from paper stacked in the paper supply cassette 6 or from a sheet hand-fed into the manual feed tray 11, the registration rollers 12 initially stops progress of the sheet of paper before supplying the sheet to an image forming unit in the process cartridge 4 at a timing synchronized with the image forming unit in the process cartridge 4.

The paper supply cassette 6 is disposed below the process cartridge 4 and the fixing unit 5 and can be inserted into and removed from the casing 2 through the front side. The paper supply cassette 6 accommodates a paper pressing plate 13 and a spring 14 disposed on the underside of the paper pressing plate 13 for urging an end of the paper pressing plate 13 nearest the feeding roller 7 upward. The paper pressing plate 13 is capable of pivoting about an end farthest from the feeding roller 7 so that the end of the paper pressing plate 13 nearest the feeding roller 7 can move up and down to accommodate sheets of a recording medium stacked on the paper feed unit 3. As the amount of paper stacked on the paper pressing plate 13 increases, the end of the paper pressing plate 13 nearest the feeding roller 7 against the urging force of the spring 14 and pivots downward about the end farthest from the feeding roller 7.

The feeding roller 8 and the separating pad 9 are disposed in confrontation with each other. A spring 15 is disposed on the underside of the separating pad 9 for urging the separating pad 9 toward the feeding roller 8. The spring 14 on the underside of the paper pressing plate 13 urges the paper pressing plate 13 so that the topmost sheet of paper stacked on the paper pressing plate 13 is pressed against the feeding roller 7. The feeding roller 7 feeds the topmost sheet to a position between the feeding roller 8 and the separating pad 9. The feeding roller 8 rotates to feed the topmost sheet onto the paper feeding path 10, while the cooperative operations of the feeding roller 8 and separating pad 9 ensure that the sheets are separated and fed one sheet at a time.

A sheet of paper supplied from the paper supply cassette 6 or the manual feed tray 11 is conveyed to the registration rollers 12 disposed above the feeding roller 7. The registration rollers 12 first register the sheet and then convey the sheet to an image forming position beneath the process cartridge 4 (a contact position between a photosensitive drum 37 and a transfer roller 39). As mentioned earlier, the front cover 16 is provided on the front side wall 2a of the casing 2 and can be freely opened and closed on the casing 2. When the front cover 16 is in an open state, a front side opening is revealed in the casing 2 through which the process cartridge 4 can be inserted or removed.

A scanning unit 100 is also provided above the process cartridge 4 in the top section of the casing 2. The fixing unit 100 includes a laser diode 271 (FIG. 3) for emitting a laser beam, a polygon mirror 110 that scanningly deflects the laser beam emitted from the laser diode 271 in the main scanning direction while rotating at a high speed, a polygon motor 112 (FIG. 4) that drives the polygon mirror 110 to rotate at a high speed, an fθ lens 120 that converges the laser beam in the scanning direction of the polygon mirror 110 (main scanning direction) and regulates the scanning speed over the photosensitive drum 37 to maintain a constant speed, a cylindrical lens 140 formed of a synthetic resin material that converges the laser beam in a sub-scanning direction perpendicular to the main scanning direction (the rotational direction of the photosensitive drum 37), a first reflecting mirror 130, a second reflecting mirror 131, and the like.

The laser diode 271 emits a laser beam that is modulated according to image data. As indicated by a single-dot chain line in the scanning unit 100 of FIG. 2, the laser beam passes through or is reflected off the polygon mirror 110, the fθ lens 120, the first reflecting mirror 130, the cylindrical lens 140, and the second reflecting mirror 131 in the order given and is scanned over the surface of the photosensitive drum 37 in the process cartridge 4.

The rigid plate 190 is configured of a steel sheet in the present embodiment, and is positioned beneath the top cover 18. The rigid plate 190 spans between the side frame 190b and side frame 190d (FIG. 1). The rigid plate 190 also serves as a top cover for the scanning unit 100.

The process cartridge 4 includes a drum cartridge 35 and a developing cartridge 36. The drum cartridge 35 accommodates the photosensitive drum 37, a charger 38, a transfer roller 39, and the like. As described above, the process cartridge 4 can be mounted in and removed from the casing 2 via the front side opening when the front cover 16 is open. The developer cartridge 36 is detachably mounted on the drum cartridge 35 and includes a developing roller 40, a thickness regulating blade 41, a supply roller 42, a toner hopper 43, and the like.

The toner hopper 43 accommodates toner. The toner hopper 43 is provided with a toner supply opening 46 formed in a side thereof and houses a rotational shaft 44 and an agitator 45 rotatably supported on the rotational shaft 44. The agitator 45 is driven to rotate in the direction of the arrow shown in FIG. 2 to agitate the toner accommodated in the toner hopper 43 so that some of the toner is discharged through the toner supply opening 46. The supply roller 42 is rotatably disposed at a position to the side of the toner supply opening 46. The developing roller 40 is rotatably disposed in confrontation with the supply roller 42 and contacts the supply roller 42 with sufficient pressure so that the developing roller 40 and supply roller 42 compress to a degree.

The developing roller 40 is configured of a metal roller shaft covered by a roller formed of an electrically conductive rubber material. The developing roller 40 is driven to rotate in the direction indicated by the arrow (counterclockwise in FIG. 2). A developing bias is applied to the developing roller 40. The thickness regulating blade 41 is disposed near the developing roller 40 and includes a main blade member configured of a metal leaf spring member, and a pressing part provided on a distal end of the main blade member. The pressing part has a semicircular cross section and is formed of an insulating silicon rubber. The thickness regulating blade 41 is supported on the developer cartridge 36 near the developing roller 40 so that the elastic force of the main blade member causes the pressing part to contact the developing roller 40 with pressure.

Toner discharged through the toner supply opening 46 is supplied to the developing roller 40 by the rotation of the supply roller 42. At this time, the toner is positively tribocharged between the supply roller 42 and the developing roller 40. As the developing roller 40 rotates, the toner supplied onto the surface of the developing roller 40 passes between the thickness regulating blade 41 and the developing roller 40, thereby maintaining a uniform thin layer of toner on the surface of the developing roller 40.

The photosensitive drum 37 is disposed in the drum cartridge 35 to the side of the developing roller 40 and can rotate in the direction indicated by the arrow (clockwise in FIG. 2) while in confrontation with the developing roller 40. The photosensitive drum 37 is configured of a main drum body that is grounded and a surface layer formed of a positive charging photosensitive layer of polycarbonate or the like.

The charger 38 is disposed diagonally above and to the rear of the photosensitive drum 37, confronting the photosensitive drum 37 but separated a predetermined distance therefrom. The charger 38 is a positive charging Scorotron charger having a charging wire formed of tungsten or the like from which a corona discharge is generated. The charger 38 functions to charge the entire surface of the photosensitive drum 37 with a uniform positive polarity.

The transfer roller 39 is disposed below the photosensitive drum 37 and in opposition thereto, and is supported in the drum cartridge 35 so as to be capable of rotating in the direction indicated by the arrow (counterclockwise in FIG. 2). The transfer roller 39 includes a metal roller shaft covered by a roller that is formed of an electrically conductive rubber material. A transfer bias is applied to the transfer roller 39 during a transfer operation.

As the photosensitive drum 37 rotates, the charger 38 charges the surface of the photosensitive drum 37 with a uniform positive polarity. Subsequently, the surface of the photosensitive drum 37 is exposed to a laser beam emitted from the scanning unit 100, forming an electrostatic latent image on the surface of the photosensitive drum 37. Next, the positively charged toner carried on the surface of the developing roller 40 is brought into contact with the photosensitive drum 37 as the developing roller 40 rotates. At this time, due to the developing bias applied to the developing roller 40, the latent image formed on the surface of the photosensitive drum 37 is developed into a toner image when the toner is selectively attracted to portions of the photosensitive drum 37 that were exposed to the laser beam and, therefore, have a lower potential than the rest of the surface having a uniform positive charge. In this way, a reverse developing process is achieved.

Subsequently, the toner image carried on the surface of the photosensitive drum 37 is transferred onto the paper due to the transfer bias applied to the transfer roller 39, as the sheet of paper passes between the photosensitive drum 37 and the transfer roller 39.

The fixing unit 5 is disposed above the paper supply cassette 6 and to the side and downstream of the process cartridge 4 with respect to the paper conveying direction. The fixing unit 5 includes a heating roller 51, and a pressure roller 52 disposed in confrontation with the heating roller 51 and urged to contact the heating roller 51 with pressure. The heating roller 51 accommodates an internal heater.

After a visible toner image is transferred onto a sheet of paper at the process cartridge 4, the toner image is fixed to the sheet in the fixing unit 5 by the heat of the heating roller 51 as the sheet passes between the heating roller 51 and the pressure roller 52. Subsequently, the heating roller 51 and pressure roller 52 convey the sheet onto a paper discharge path 76 formed in the paper discharge unit 70.

The paper discharge unit 70 includes an inner guide member 71 and an outer guide member 62 that form the paper discharge path 76; lower discharge rollers 73 and upper discharge rollers 75 forming pairs of discharge rollers disposed in a discharge opening through which the paper is discharged onto the sheet discharge tray 72 provided on the top cover 18; and a tray member 74 constituting part of the sheet discharge tray 72.

The outer guide member 62 moves in association with the opening and the closing of the rear cover 60 provided on the rear side wall 2c of the casing 2. The rear cover 60 is attached to the casing 2 via a hinge 61 and is capable of swinging open and closed about the hinge 61. When the rear cover 60 is swung to an open position, the top portion of the outer guide member 62 pivots rearward in association. In this way, the paper discharge path 76 can be exposed through an opening formed in the rear side wall 2c by opening the rear cover 60. Heat dissipation openings 60a are formed in the rear cover 60 for allowing heat to be released from the fixing unit 5.

The discharge tray 72 is substantially rectangular in shape in a plan view. The rear end of the discharge tray 72 is formed as a depressed portion that is depressed toward inside the casing 2 and slopes gradually upward toward the front wall 2a side of the casing 2. In the present embodiment, a section of the sheet discharge tray 72 that slopes gradually upward from the rear end to a point in the middle of the sheet discharge tray 72 is configured by the tray member 74. The top surface of the tray member 74 on the front end (the downstream end in the paper conveying direction) is configured to contact the bottom surface of the rear end (the upstream end) of the top cover 18.

Hence, after passing through the fixing unit 5, the sheet of paper is conveyed along the paper discharge path 76. The paper discharge path 76, configured by the inner guide member 71 and the outer guide member 62, turns the direction in which the sheet is conveyed so that the sheet is directed toward the pair of discharge rollers 73 and 75. The discharge rollers 73 and 75 discharge the sheet of paper onto the sheet discharge tray 72 toward the front side wall 2a side. The rigid plate 190 spans directly beneath the portion of the sheet discharge tray 72 configured of the top cover 18.

(2) Detailed Construction of the Scanning Unit 100

Figure 3:
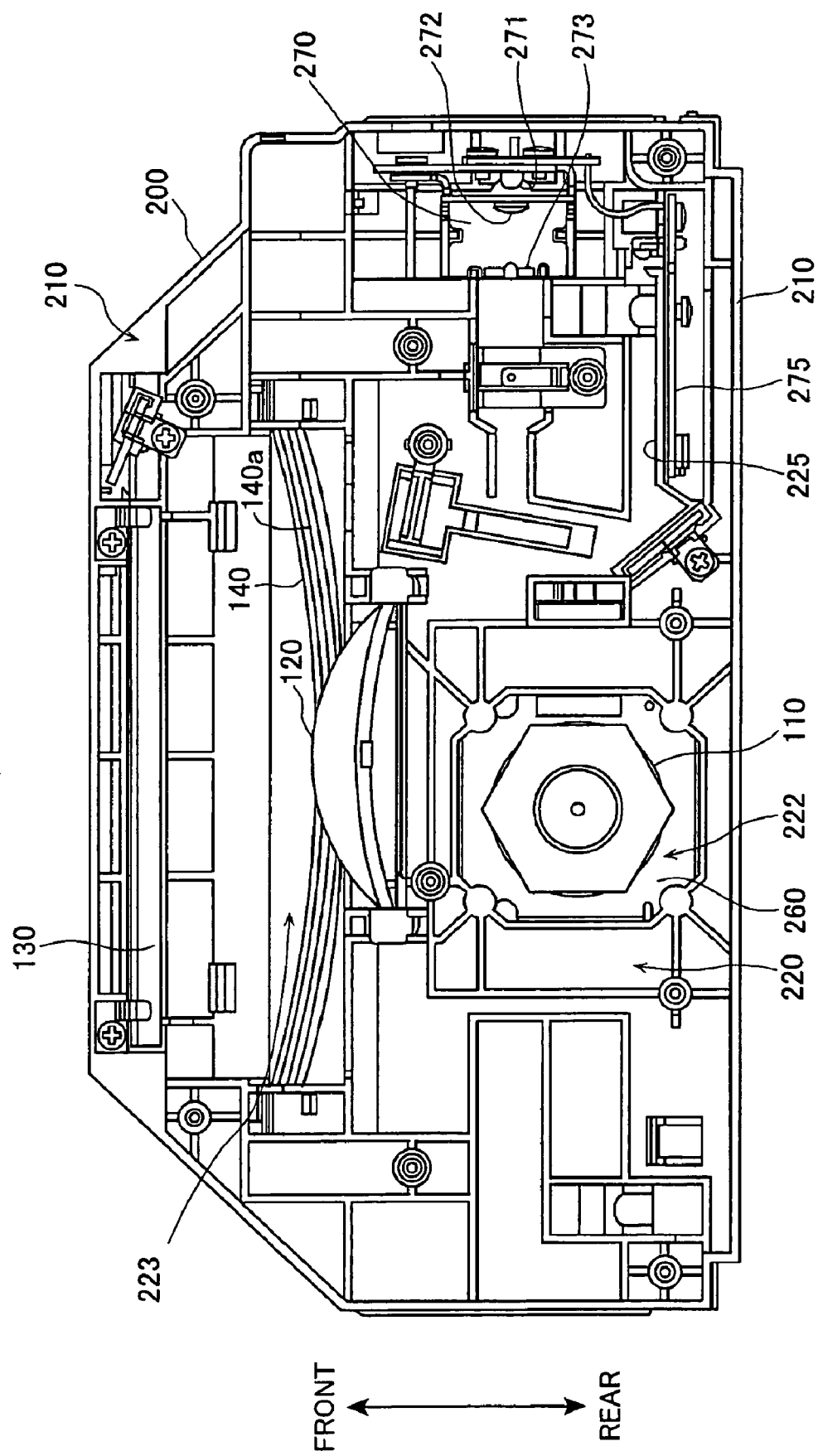
FIG. 3 is a plan view showing the construction of a scanning unit provided in the laser printer.

Next, the construction of the scanning unit 100 according to the present embodiment will be described in detail. FIG. 3 is a plan view of the scanning unit 100, while FIG. 4 is a vertical cross-sectional view of the scanning unit 100.

Figure 4:
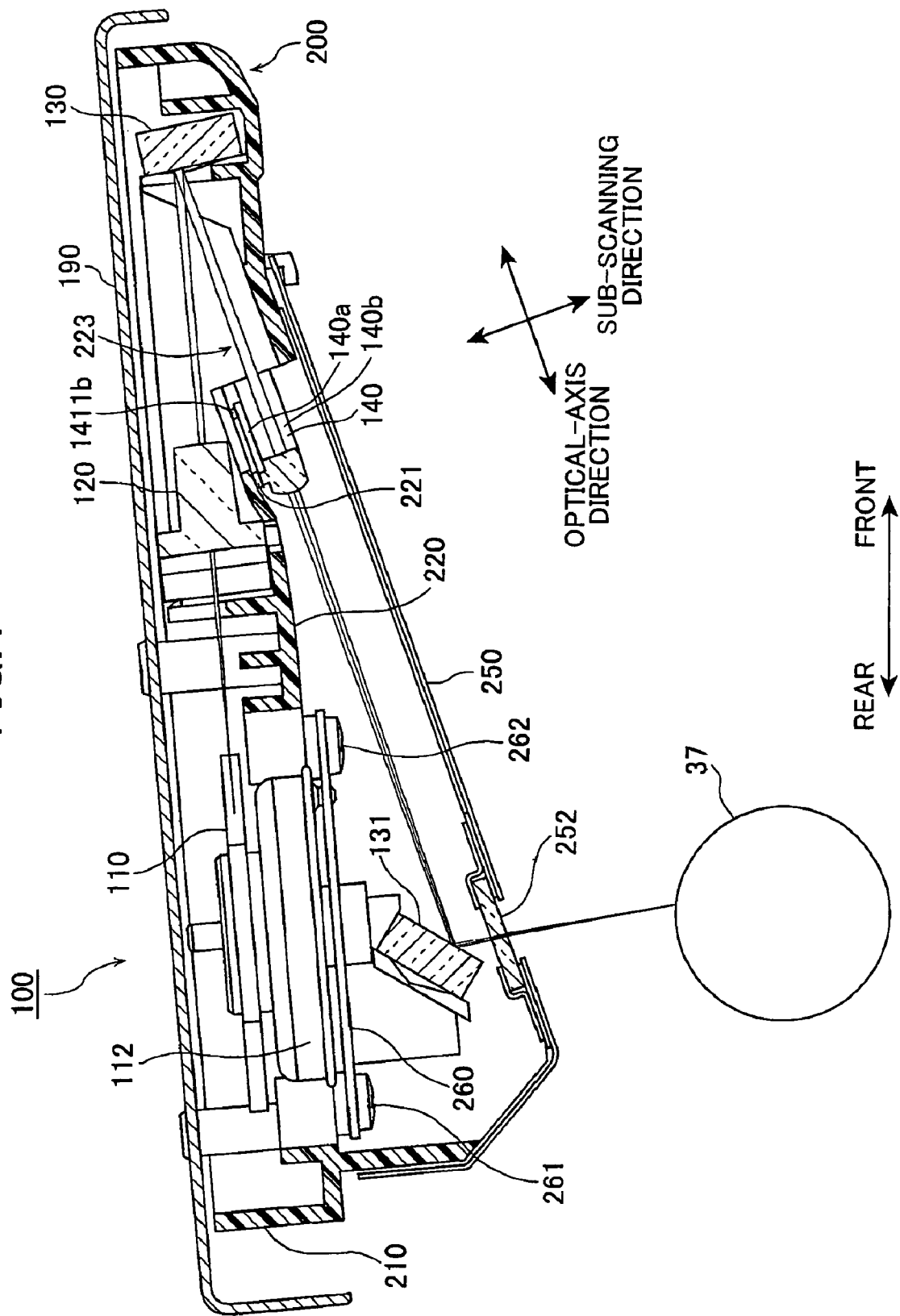
FIG. 4 is a vertical cross-sectional view of the scanning unit.
Figure 5:
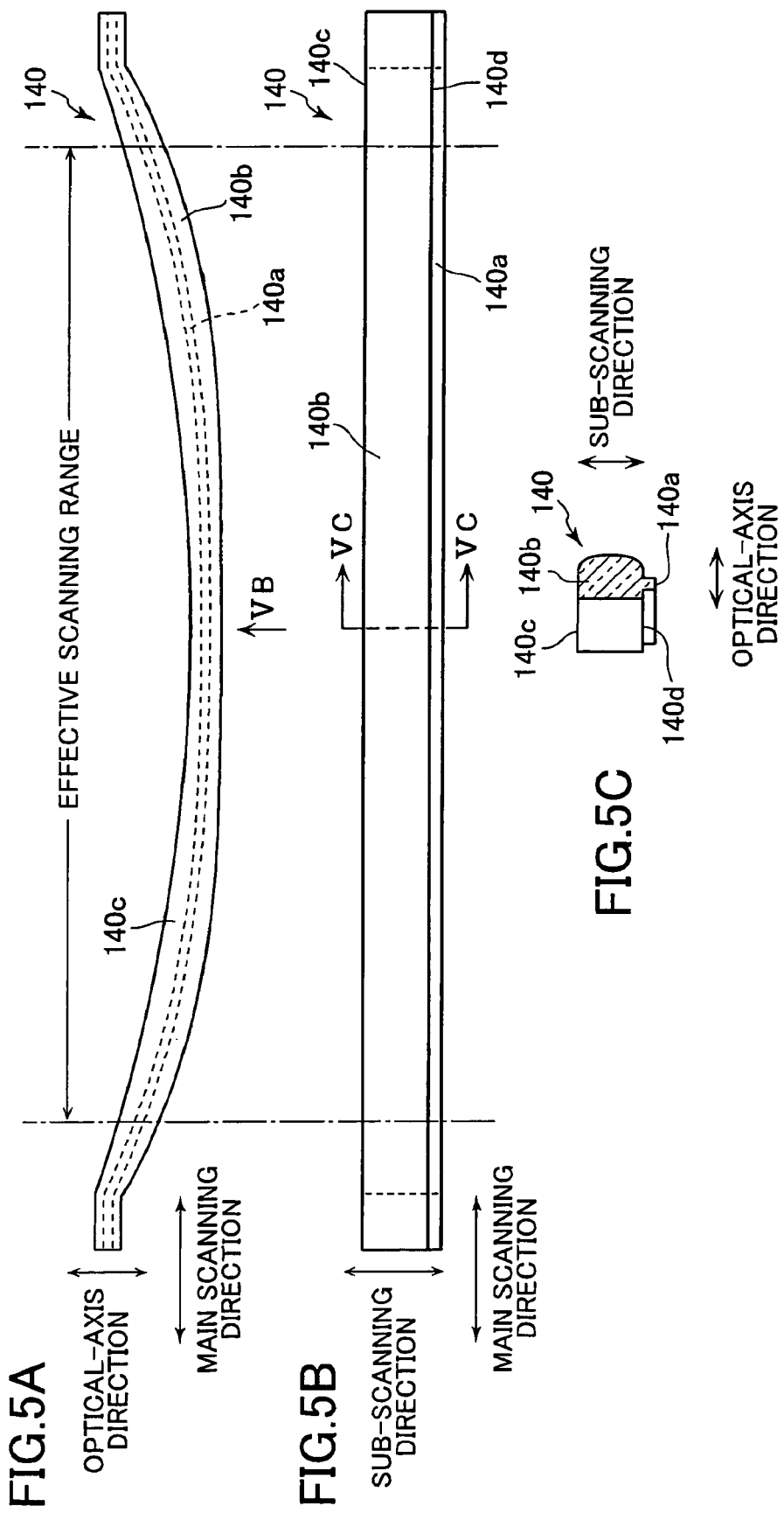
FIG. 5A is an explanatory diagram showing a cylindrical lens according to the first embodiment, as viewed from the side in a sub-scanning direction opposite the side on which a rib is provided.
FIG. 5B is an explanatory diagram showing the cylindrical lens, as viewed from a direction indicated by an arrow VB in FIG. 5A.
FIG. 5C is a cross-sectional view of the cylindrical lens along a line VC-VC in FIG. 5B.

As shown in FIGS. 3 and 4, the scanning unit 100 has a unit frame 200 formed of a glass-reinforced resin, for example, that can be manufactured as a single unit through injection molding. The unit frame 200 includes a planar base frame 220 on which the polygon mirror 110, fθ lens 120, and the like are mounted; and a peripheral part 210 constituting the peripheral walls that surround the lateral periphery of the base frame 220. A space 223 is formed in the unit frame 200 through which a laser beam can pass from the upper side of the scanning unit 100 on which the first reflecting mirror 130 is mounted to the lower side on which the second reflecting mirror 131 is mounted. The scanning unit 100 also includes a lower cover 250 on the bottom thereof that defines the bottom of the space 223. An opening is formed in the lower cover 250 below the second reflecting mirror 131. A glass plate 252 is fixed in the opening.

The base frame 220 has an opening 222 (FIG. 3) in the region that the polygon motor 112 (FIG. 4) is mounted. The polygon motor 112 is supported on a base plate 260. In order to produce a thinner scanning unit 100, the base plate 260 is fastened by screws 261 and 262 inserted through the base plate 260 from below the opening 222.

As shown in FIG. 3, an LD holder 270 is mounted on the base frame 220. Mounted in the LD holder 270 are the laser diode 271 for emitting a laser beam, a collimator lens 272 for collimating the laser beam into parallel rays, and a slitted plate 273 having slits for correcting the shape of the parallel rays. A circuit board mounting portion 225 is formed integrally with the base frame 220 by injection molding, and protrudes upward from the base frame 220 inside of and along an outer wall of the peripheral part 210. An LD control board 275 is mounted on the circuit board mounting portion 225 for driving the laser diode 271.

The laser beam emitted from the laser diode 271 is scanningly deflected by the polygon mirror 110, passes through the fθ lens 120, is reflected off the first reflecting mirror 130, and travels to the lower section of the base frame 220 through the space 223. Subsequently, the laser beam passes through the cylindrical lens 140, is reflected by the second reflecting mirror 131, and passes through the glass plate 252 to irradiate the surface of the photosensitive drum 37.

In the present embodiment, the thickness of the cylindrical lens 140 in the sub-scanning direction is reduced to about 6 mm in order to produce a thinner scanning unit 100. When attempting to manufacture a more compact device by reducing the thickness of a scanning lens in the sub-scanning direction (particularly a lens capable of condensing a laser beam in the sub-scanning direction), warpage of the lens described earlier is a particular problem. That is, the mechanism provided for correcting the warpage must be considerably large, as described in Japanese patent-application publication No. 2001-91879, since the lens may warp upward or downward.

FIGS. 5A through 5C are explanatory diagrams showing the configuration of the cylindrical lens 140 according to the present embodiment. FIG. 5A shows a view of the cylindrical lens 140 from the side in the sub-scanning direction opposite the side on which a rib 140a is provided. FIG. 5B is a view of the cylindrical lens 140 from the direction indicated by the arrow VB in FIG. 5A. FIG. 5C is a cross-sectional view of the cylindrical lens 140 along the line VC-VC in FIG. 5B.

As shown in FIGS. 5A through 5C, the cylindrical lens 140 includes a lens body 140b and a protruding rib 140a. The lens body 140b is formed of a resin material and extending substantially in the main scanning direction. The lens body 140b defines the sub-scanning direction (the height direction in FIGS. 5B and 5C) perpendicular to the main scanning direction. The lens body 140b has opposite surfaces 140c and 140d, both of which have substantially planar shapes and are substantially perpendicular to the sub-scanning direction. The rib 140a is formed integrally with the lens body 140b and protrudes in the sub-scanning direction from the surface 140d. That is, the rib 140a is provided on only one side (the surface 140d side) of the cylindrical lens 140 with respect to the sub-scanning direction. As shown in FIG. 4, the rib 140a protrudes toward the base frame 220. In the present embodiment, as shown in FIGS. 5A and 5B, the rib 140a extends over an entire range of the cylindrical lens 140 in the main scanning direction. As will be described later, the rib 140a functions to restrict warpage in the cylindrical lens 140 to a single direction.

The resin material used to form the cylindrical lens 140 is, for example, an amorphous olefin resin, a crystalline olefin resin, a PMMA resin, a copolymer containing acrylate or an acrylate compound, a mixture containing a polymer of acrylate or an acrylate compound, a MS resin, a copolymer containing an aromatic carbonate or an aromatic carbonate compound, a mixture containing a polymer of an aromatic carbonate or aromatic carbonate compound, a copolymer of an aromatic carbonate or aromatic carbonate compound and styrene or a styrene compound, or a mixture containing a polymer of an aromatic carbonate or aromatic carbonate compound and a polymer of styrene or a styrene compound.

The cylindrical lens 140 is formed of a resin material by injection molding. Normally, when the lens is removed from the mold after formation, a gate portion remains in one edge of the lens corresponding to the gate portion through which resin was introduced. However, the gate portion of the scanning lenses has been omitted from these drawings.

When the rib 140a is formed as a protrusion from only one side in the sub-scanning direction, the rib 140a of the cylindrical lens 140 tends to cool faster and harden first when the cylindrical lens 140 is cooled in the mold, due to the smaller volume of the rib 140a. The lens body 140b of the cylindrical lens 140 will harden after the rib 140a but, because the rib 140a has already hardened, will warp toward the side opposite that of the rib 140a (a direction of warpage indicated by arrows C in FIG. 8A) because the lens body 140b contracts when cooling and hardening. As a result, warpage occurring in the lens during formation can be aligned in a single direction.

By aligning the warpage in a single direction in this way, the mechanism for correcting warpage when the lens is mounted in the scanning unit can be greatly simplified as will be described below.

Figure 6:
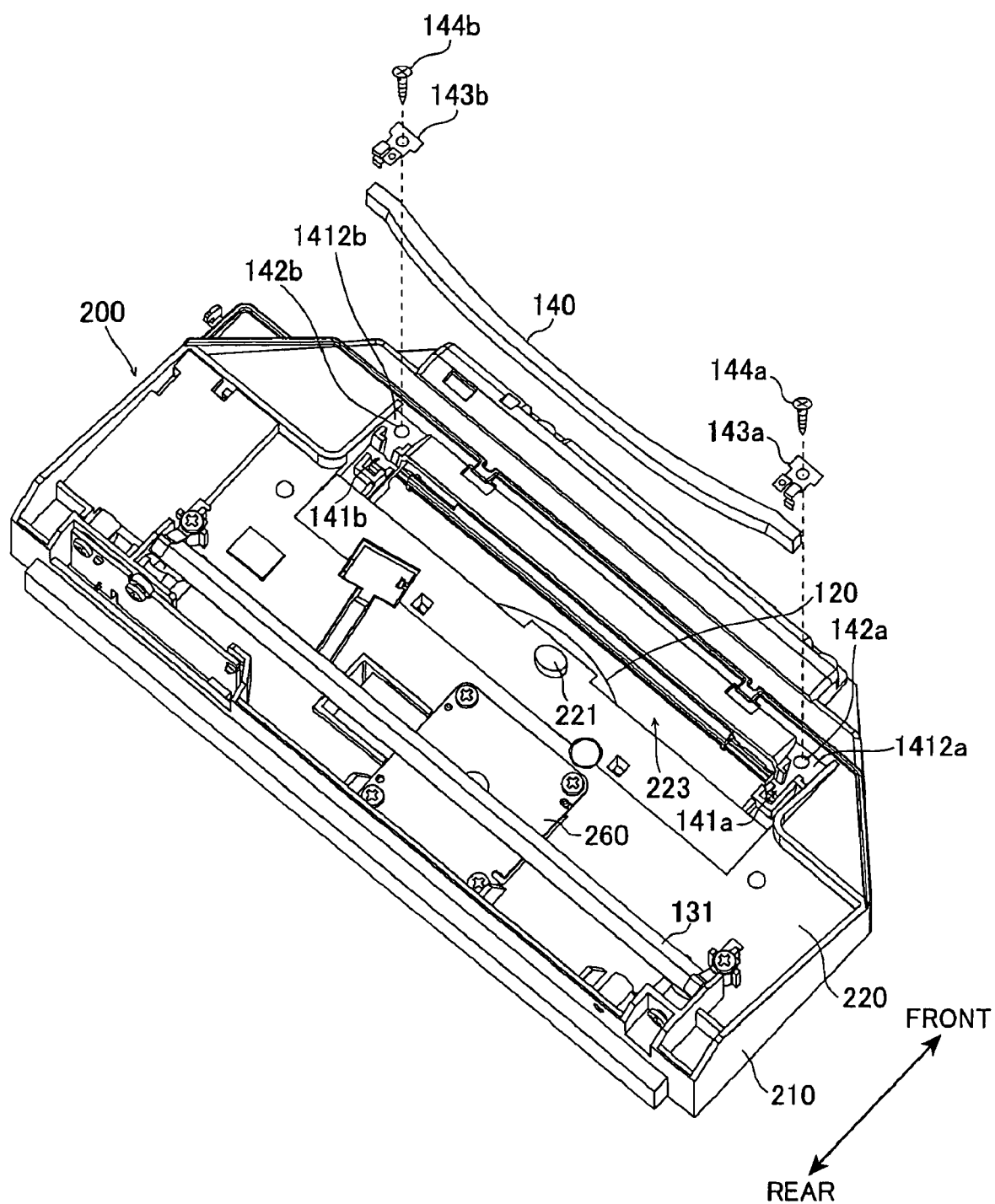
FIG. 6 is a perspective view illustrating how the cylindrical lens is mounted on an underside surface of a base frame.

FIG. 6 is a perspective view illustrating how the cylindrical lens 140 is mounted on the underside surface of the unit frame 200.

As shown in FIG. 6, a pair of fixing portions 141a and 141b is integrally formed with the unit frame 200 through injection molding. The fixing portions 141a and 141b are provided for fixing the cylindrical lens 140 to the underside surface of the base frame 220 near the space 223. Screw holes 142a and 142b are formed in the fixing portions 141a and 141b, respectively. The cylindrical lens 140 is fixed to the base frame 220 by screws 144a and 144b and mounting brackets 143a and 143b.

Figure 7A:
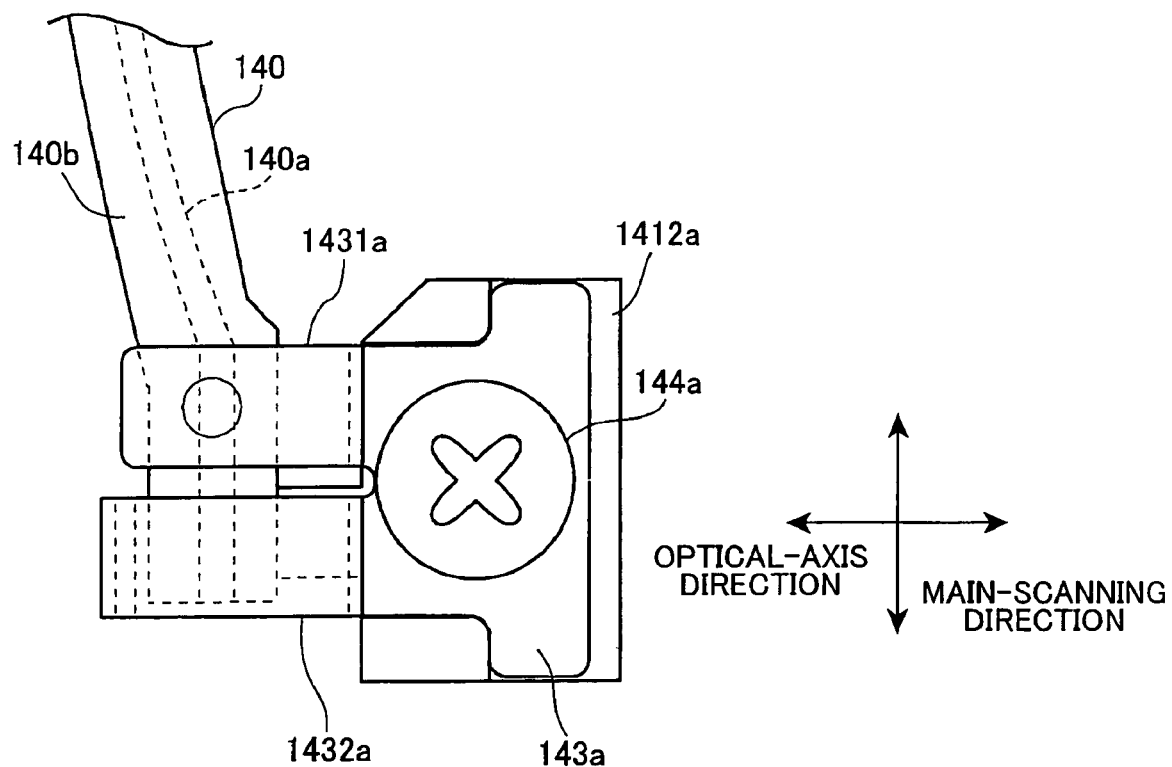
FIG. 7A is an explanatory diagram illustrating a mounting bracket for mounting the cylindrical lens on a unit frame, as viewed from a direction in which a screw is inserted.
Figure 7B:
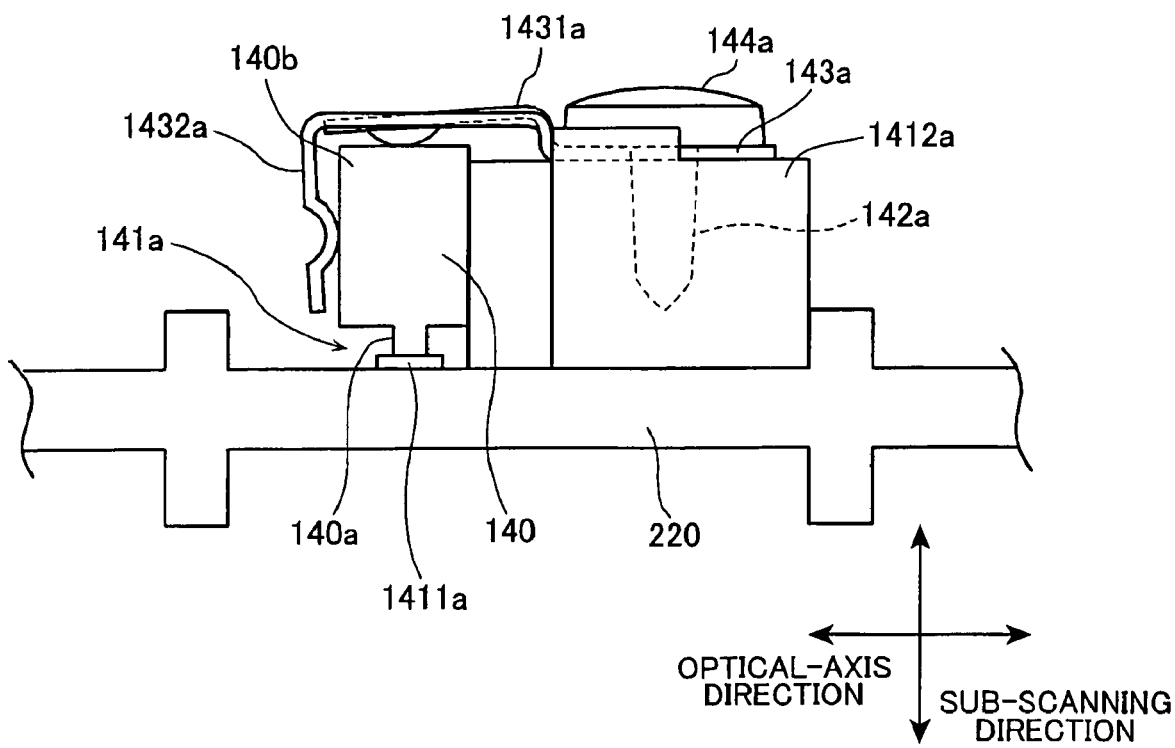
FIG. 7B is a side view of the mounting bracket shown in FIG. 7A.

FIGS. 7A and 7B are explanatory diagrams illustrating the function of the mounting brackets 143a and 143b in detail. The following description focuses on the mounting bracket 143a. FIGS. 7A and 7B show the mounting bracket 143a fastened to the fixing portion 141a. FIG. 7A is a view of the mounting bracket 143a from the direction in which the screw 144a is inserted. FIG. 7B is a side view of the mounting bracket 143a.

As shown in FIGS. 6 and 7B, the fixing portions 141a and 141b have screw-base portions 1412a and 1412b for threading the screws 144a and 144b therein, respectively. The cylindrical lens 140 is mounted on the unit frame 200 by first loosely placing both longitudinal ends of the cylindrical lens 140 on the fixing portions 141a and 141b and placing the mounting brackets 143a and 143b both on the longitudinal ends of the cylindrical lens 140 and on the screw-base portions 1412a and 1412b. Next, the cylindrical lens 140 is fixed to the underside surface of the base frame 220 by threading the screws 144a and 144b into the screw holes 142a and 142b formed in the screw-base portions 1412a and 1412b.

The mounting bracket 143a includes a leaf spring portion 1431a for pressing against and fixing the cylindrical lens 140 from the top side in the sub-scanning direction (the side opposite the side on which the rib 140a is provided), and a leaf spring portion 1432a for pressing against and fixing the cylindrical lens 140 in a direction along the optical axis (optical-axis direction). The cylindrical lens 140 is then fixed to the unit frame 200 by inserting the screw 144a into the screw hole 142a. The mounting brackets 143a and 143b can be manufactured of a metal such as stainless steel.

As shown in FIG. 7B, the fixing portion 141a of the base frame 220 is provided with a protrusion 1411a at a position in which the fixing portion 141a is contacted by the rib 140a. Since this construction is identical to that of the fixing portion 141b, a description of the fixing portion 141b is omitted. The protrusion is provided at a position coinciding with the rib 140a to improve positioning accuracy since a protrusion can be formed more accurately than a planar surface due to the nature of forming the base frame 220 through injection molding. However, it is not necessary for the protrusion to contact the rib 140a. The protrusion may be configured to contact a portion of the cylindrical lens 140 other than the rib 140a (i.e., the lens body 140b).

As shown in FIG. 6, a protrusion 221 is provided on the underside surface of the base frame 220. The protrusion 221 is positioned in a center part with respect to the main scanning direction for contacting the cylindrical lens 140. Like the protrusion 1411a, the protrusion 221 is provided for improving the positioning accuracy during injection molding.

Next, the method of correcting warpage in the cylindrical lens 140 will be described with reference to FIGS. 8A and 8B. FIG. 8A is a front view of the cylindrical lens 140 as viewed in the optical-axis direction. FIG. 8B is an explanatory diagram showing the cylindrical lens 140 fixed to the base frame 220.

As shown in FIG. 8A, when the cylindrical lens 140 is cooled after molding, the cylindrical lens 140 warps in a single direction indicated by arrows C. Pressing forces P1 and P2 are applied in the sub-scanning direction to both ends of the cylindrical lens 140 by the mounting brackets 143a and 143b, and particularly by the leaf spring portion 1431a, while the center part of the rib 140a in the main scanning direction contacts the protrusion 221. In other words, the pressing forces P1 and P2 are applied to the top of the fixing portions 141a and 141b.

This pressure has the effect of correcting warpage of the cylindrical lens 140 in the direction C shown in FIG. 8A. Such an extremely simple construction as the mounting bracket 143a and the like can be used to correct warpage because the rib 140a ensures that warpage occurs in a single direction. However, it may be desirable that the degree of correction caused by pressure in the direction P not become too large to ensure proper optical characteristics of the cylindrical lens 140. Hence, it may be desirable to adjust the rigidity of the leaf spring portion 1431a portion, in particular, to an optimal level.

By providing the protruding rib 140a on only one side of the cylindrical lens 140 with respect to the sub-scanning direction, the laser printer 1 can ensure that the cylindrical lens 140 warps in a single direction. By restricting the direction of warpage in this way, a mechanism for correcting warpage can be simplified and, ultimately, a more compact laser printer can be made using smaller parts for mounting the cylindrical lens 140.

The shape of the cylindrical lens is not limited to that shown in FIGS. 5A through 5C. FIGS. 9A through 9C show a cylindrical lens 1140 having a different shape. In the example of FIGS. 9A through 9C, the thickness of the cylindrical lens 1140 in the sub-scanning direction has been adjusted to achieve a substantially uniform cross-sectional area at all points in the main scanning direction. In other words, portions of the cylindrical lens 1140 that are thicker in the direction of the optical axis shown in FIG. 9A are made thinner in the sub-scanning direction shown in FIG. 9B, while portions that are thinner in the direction of the optical axis are made thicker in the sub-scanning direction. In this example, a lens body 1140b has opposite surfaces 1140c and 1140d. The surface 1140d has a planar shape and is substantially perpendicular to the sub-scanning direction, while the surface 1140c has a curved shape (but still substantially perpendicular to the sub-scanning direction). A rib 1140a protrudes in the sub-scanning direction from the planar surface 1140d.

By forming the cylindrical lens 1140 with a substantially uniform cross-sectional area over the entire main scanning direction, the volume of the lens is uniform and, hence, the thermal capacity is substantially the same over the main scanning direction. Accordingly, when forming the cylindrical lens 140, uniform cooling can be achieved at all parts of the lens, thereby improving the optical characteristics of the lens.

While the cylindrical lenses 140 and 1140 are described in the above embodiment, another type of scanning lens formed of a synthetic resin material may be used. However, the present invention is more effective when applied to a scanning lens having the capacity to converge a laser beam in the sub-scanning direction.

A color image forming apparatus according to a second embodiment of the present invention will be described while referring to FIGS. 10 through 13. The color image forming apparatus forms color images by superposing images formed in a plurality of colors.

Figure 10:
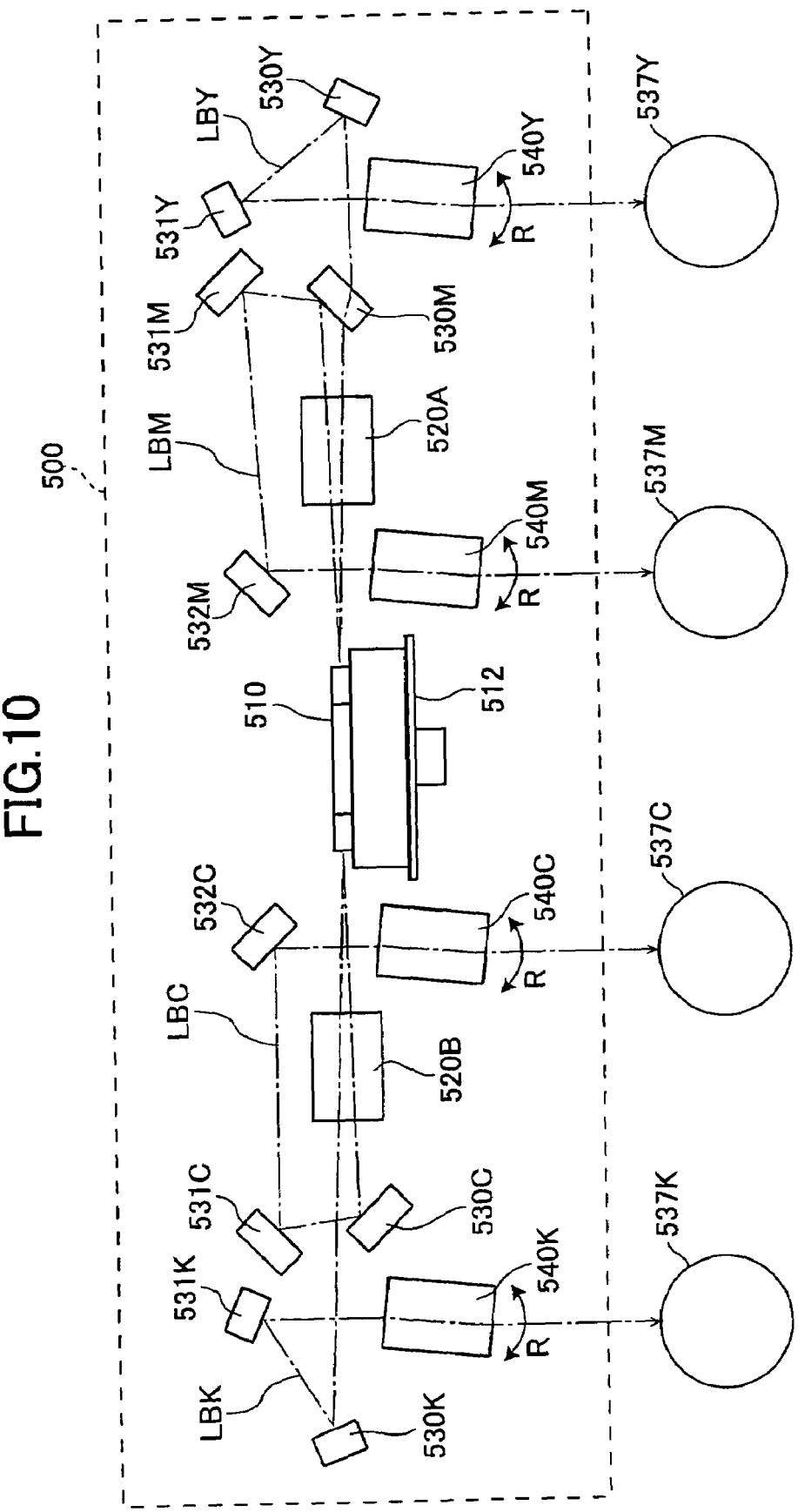
FIG. 10 is an explanatory diagram showing a scanning unit employed in a color image forming apparatus according to a second embodiment of the present invention.

FIG. 10 is an explanatory diagram showing the construction of a scanning unit 500 employed in the color image forming apparatus. The color image forming apparatus of the present embodiment forms color images by superposing toner images in the colors yellow (Y), magenta (M), cyan (C), and black (K) on a recording medium such as paper. Hereinafter, the letters Y, M, C, and K will be used to represent the respective colors yellow, magenta, cyan, and black and will be appended to reference numerals of components related to the corresponding colors.

The scanning unit 500 shown in FIG. 10 is employed in a tandem-type color image forming apparatus. This type of color image forming apparatus includes a plurality of photosensitive drums 537K, 537C, 537M, and 537Y corresponding to each color. The scanning unit 500 scans laser beams LBK, LBC, LBM, and LBY based on image data for the corresponding color image over the respective photosensitive drums 537K through 537Y, producing latent images on each photosensitive drum. The latent images formed on each photosensitive drum are developed with toner, and the resulting toner images are sequentially transferred onto an intermediate transfer member or a recording medium such as paper and superposed on one another to form a color image.

A polygon mirror 510 has a plurality (six in this example) of reflecting surfaces, and is disposed in the central region of the scanning unit 500 with respect to the horizontal. A polygon motor 512 is provided for driving the polygon mirror 510 to rotate at a high speed. Light-emitting units (not shown) are disposed two on each side of the polygon mirror 510, each of which emits a laser beam so as to be obliquely incident on the surfaces of the polygon mirror 510. Here, obliquely incident signifies that the laser beams are irradiated diagonally upward and downward onto the reflecting surfaces of the polygon mirror 510 from upper and lower sides of a plane perpendicular to the rotational axis of the polygon mirror 510. Hence, laser beams irradiated upward from a position diagonally below the polygon mirror 510 that are incident on the reflecting surface thereof proceed upward after being reflected off the reflecting surface (LBM and LBK in FIG. 10), while laser beams irradiated downward from a position diagonally above the polygon mirror 510 that are incident on the reflecting surface thereof proceed downward after being reflected off the reflecting surface (LBY and LBC in FIG. 10).

The scanning unit 500 includes fθ lenses 520A and 520B for scanning the photosensitive drums at a constant speed while converging the laser beams in the main scanning direction. The fθ lens 520A is shared by laser beams LBY and LBM, while the fθ lens 520B is shared by laser beams LBC and LBK.

In the present embodiment, the scanning unit 500 includes cylindrical lenses 540Y, 540M, 540C, and 540K for each color. These lenses are formed of a synthetic resin material and function to converge the laser beams in a sub-scanning direction (rotational direction of the photosensitive drums 537Y through 537K) perpendicular to the main scanning direction. Reflecting mirrors 530Y, 530M, 530C, 530K, 531Y, 531M, 531C, 531K, 532M, and 532C are provided for guiding the laser beams for each color so that each laser beam passes through the respective cylindrical lens 540Y through 540K and strikes the surface of the respective photosensitive drum 537Y through 537K after reflecting off a surface of the polygon mirror 510 and passing through one of the fθ lenses 520A and 520B. In order to allow passage for the laser beam LBY, only an upper region of the reflecting mirror 530M is configured as a reflecting region for reflecting the laser beam LBM, while a lower region is configured as a transmitting region that allows the laser beam LBY to pass therethrough.

Each of the cylindrical lenses 540Y through 540K has a rib that protrudes from only one side of the lens in the sub-scanning direction (not shown in FIG. 10). As mentioned earlier, warpage can occur in the cylindrical lenses 540Y through 540K and, if the direction of warpage is not the same for each lens, the respective images produced through these lenses do not register properly when the color image forming apparatus superposes the images of each color to form a color image, resulting in a decline in image quality. However, forming the ribs on the cylindrical lenses 540Y through 540K ensures that the direction of warpage is in a single direction for all lenses, thereby suppressing problems in color registration and improving the image quality.

Unlike laser beams not irradiated obliquely onto the polygon mirror 510, laser beams irradiated obliquely onto the polygon mirror 510 have differing diverging characteristics and the like between the central portion and the end portions in the main scanning direction by the time the beam reaches the fθ lenses 520A and 520B. This results in a problem called bowing in which the scan lines produced on the surface of the photosensitive members are curved. In the example of FIG. 10, the cylindrical lenses 540Y through 540K are oriented so that their optical axes are inclined in the sub-scanning direction perpendicular to the scanning direction of the laser beam, thereby reducing the curvature (bowing) in the scan lines and suppressing problems in color registration.

Figure 11:
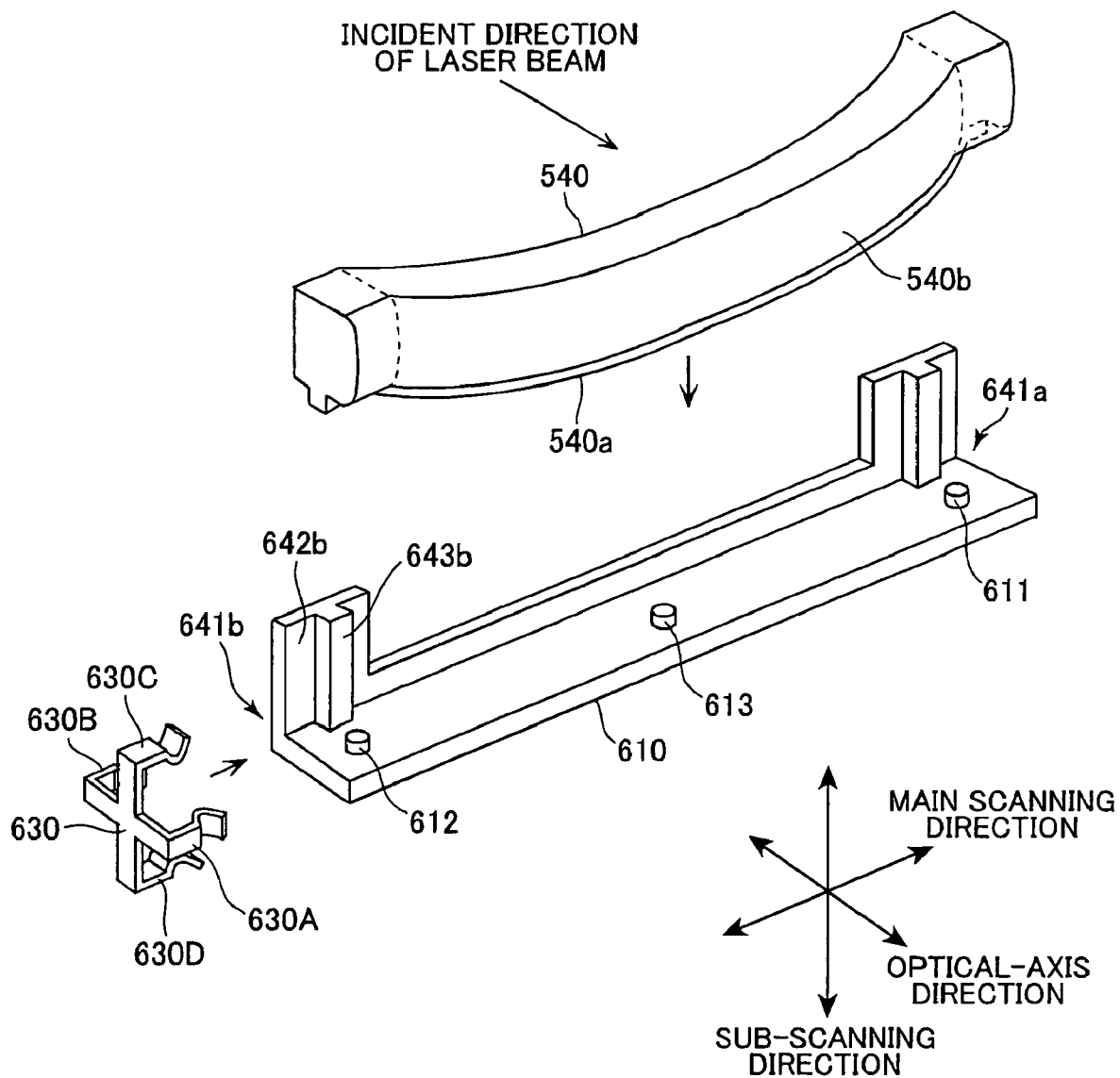
FIG. 11 is a perspective view showing how a cylindrical lens is mounted in a mounting member before being mounted in a scanning unit.

Next, a method for mounting the cylindrical lenses 540Y through 540K (hereinafter collectively referred to as a "cylindrical lens 540") in the scanning unit 500 will be described. FIG. 11 is a perspective view illustrating how the cylindrical lens 540 is first mounted in a mounting member 610 prior to being mounted in the scanning unit 500.

The mounting member 610 has fixing portions 641a and 641b for fixing the cylindrical lens 540 at its both ends with respect to the main scanning direction. The fixing portion 641b includes a vertical wall portion 642b on which a rib 643b is provided. The fixing portion 641a has a symmetrical construction. Protrusions 611, 612, and 613 are provided at three locations on one side of the mounting member 610. The cylindrical lens 540 has a rib 540a that protrudes from only one side of a lens body 540b in the sub-scanning direction. The cylindrical lens 540 is mounted on the mounting member 610 so that the rib 540a contacts the three protrusions 611 through 613. In this state, both ends of the cylindrical lens 540 are fixed to the mounting member 610 by mounting brackets 630. The mounting bracket 630 has a substantial cross-shape having four leaf spring portions 630A through 630D. The mounting bracket 630 is formed of metal, for example. The leaf spring portions 630A and 630B urge and hold the ends of the cylindrical lens 540 in the optical-axis direction. The leaf spring portions 630C and 630D urge and hold the ends of the cylindrical lens 540 in the sub-scanning direction. Although not shown in FIG. 11, another mounting bracket is provided on the fixing portion 641a side.

With this construction, as indicated by the arrows P1 and P2 in FIG. 8B, the mounting brackets 630 (the other one is not shown) apply pressing forces to both ends of the cylindrical lens 540 in a direction for correcting warpage in the cylindrical lens 540, while the protrusion 613 is in contact with the center portion of the rib 540a in the main scanning direction. The construction of the mounting brackets 630 is simple and eliminates the need to provide a large mechanism for correcting warpage, thereby facilitating the production of a compact color image forming apparatus. The protrusions 611 through 613 are provided on the mounting member 610 in areas for contacting the rib 540a (or the lens body 540b) in order to improve positioning accuracy, as was described for the protrusion 221 in the first embodiment.

Figure 12:
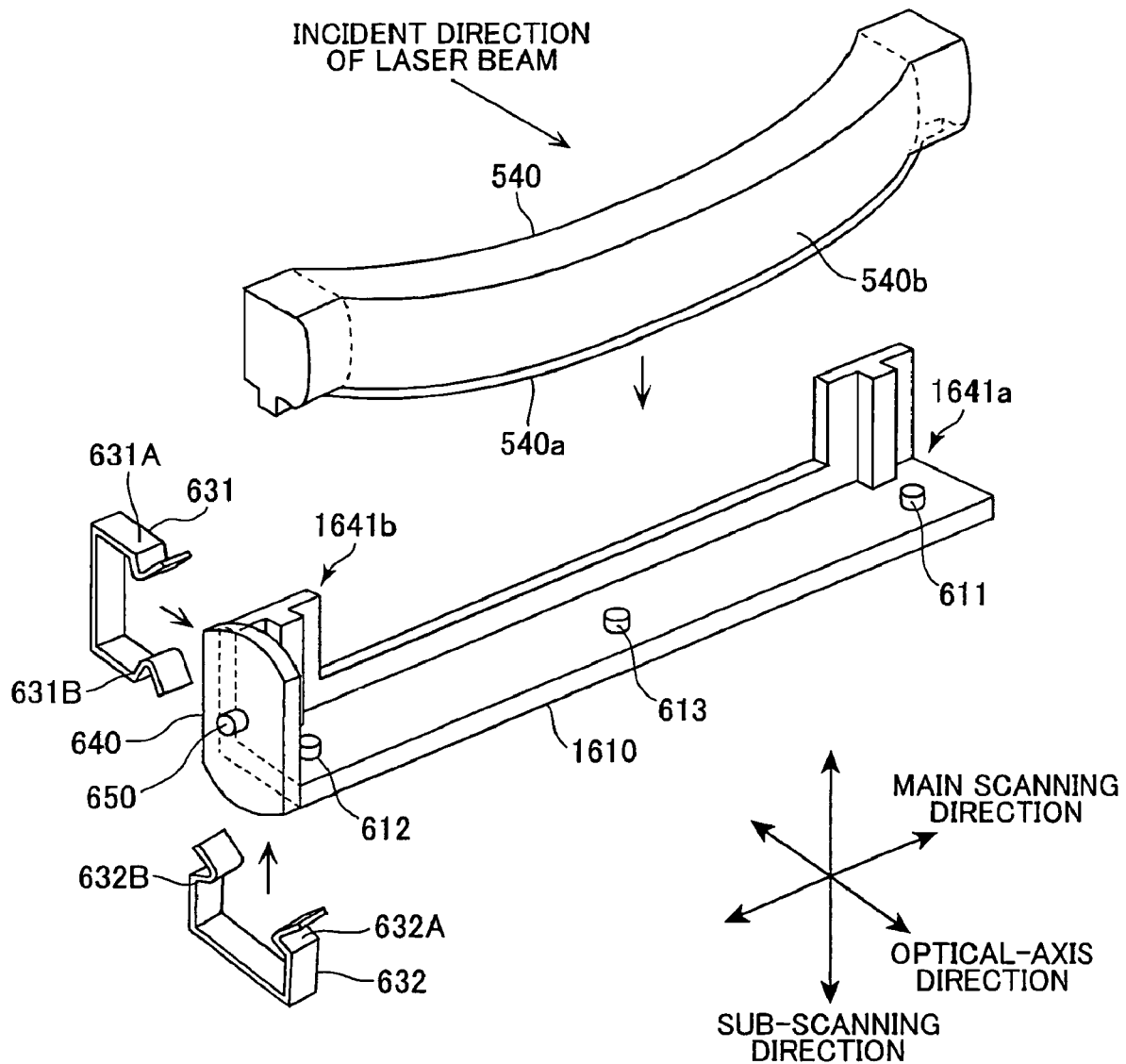
FIG. 12 is a perspective view showing another construction of a mounting member and mounting brackets for adjusting inclination of the cylindrical lens to correct bowing of scan lines.

FIG. 12 is a perspective view showing a construction of a mounting member 1610 that is suitable for adjusting inclination of the cylindrical lens 540 to correct bowing in the scan lines.

While the construction of the mounting member 1610 are essentially the same as the mounting member 610 shown in FIG. 11, the mounting member 1610 is also provided with an end plate member 640 and a rotational shaft 650 to allow rotational adjustments for correcting bowing in the scan lines. Although only the end plate member 640 and the rotational shaft 650 on a fixing portion 1641b side (left side) is shown in FIG. 12, another end plate member and rotational shaft are provided on a fixing portion 1641a side (right side). In other words, the mounting member 1610 has a symmetrical construction.

A unit frame (not shown) for supporting the mounting member 1610 is formed with concave portions (not shown) for rotatably receiving the rotational shafts 650 (the other rotational shaft is not shown). Accordingly, rotational adjustments indicated by arrows R in FIG. 10 can be performed. In order to actually perform the rotational adjustments, after the rotational positions (i.e., inclinations) of the cylindrical lenses 540Y through 540K are adjusted at appropriate rotational positions, the rotational shafts 650 and the concave portions in the unit frame are fixed by gluing or the like. In this way, curvature in the scan lines can be corrected by adjusting the rotational positions of the mounting member 610 about the rotational shafts 650. In this example, two mounting brackets 631 and 632 are used to fix the cylindrical lens 540 to the mounting member 1610. The mounting bracket 631 has leaf spring portions 631A and 631B that apply elastic forces in the sub-scanning direction for correcting warpage in the cylindrical lens 540. The mounting bracket 632 has leaf spring portions 632A and 632B that apply elastic forces in the optical-axis direction for fixing and positioning the cylindrical lens 540 to the mounting member 1610.

Figure 13:
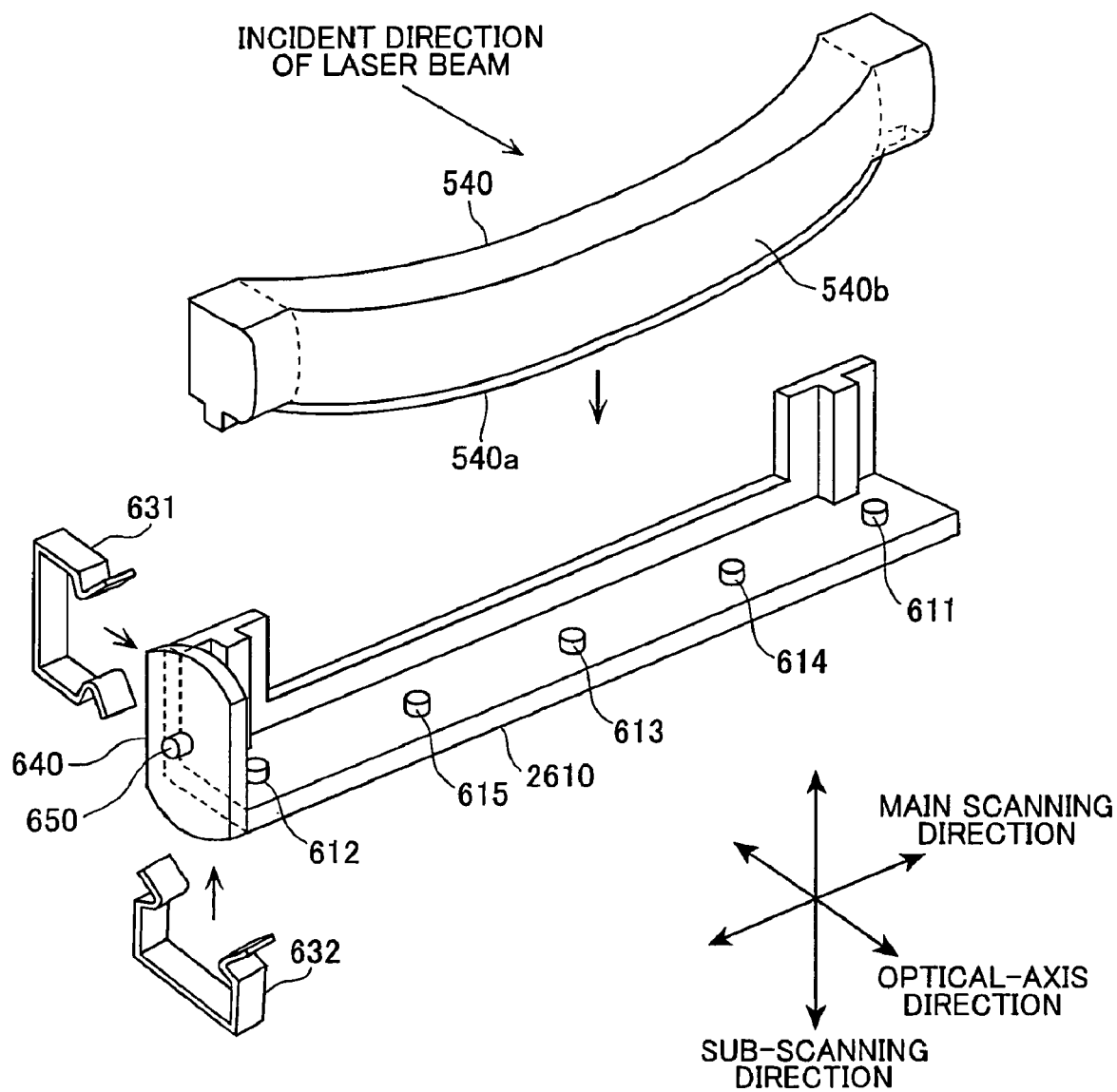
FIG. 13 is a perspective view showing another construction of a mounting member having a larger number of contact portions.

Depending on the shape and the like of the cylindrical lens 540, it may be desirable to increase the number of points on the mounting member 610 that contact the rib 540a. FIG. 13 shows a mounting member 2610 having such construction. As shown in FIG. 13, protrusions 614 and 615 are provided in addition to protrusions 611 through 613. The heights of the protrusions 611 through 615 may also be varied. For example, if the warpage in the cylindrical lens 540 is somewhat complex, it may be possible to correct the warpage by adjusting the heights of the protrusions 611 through 615 appropriately.

Figure 14:
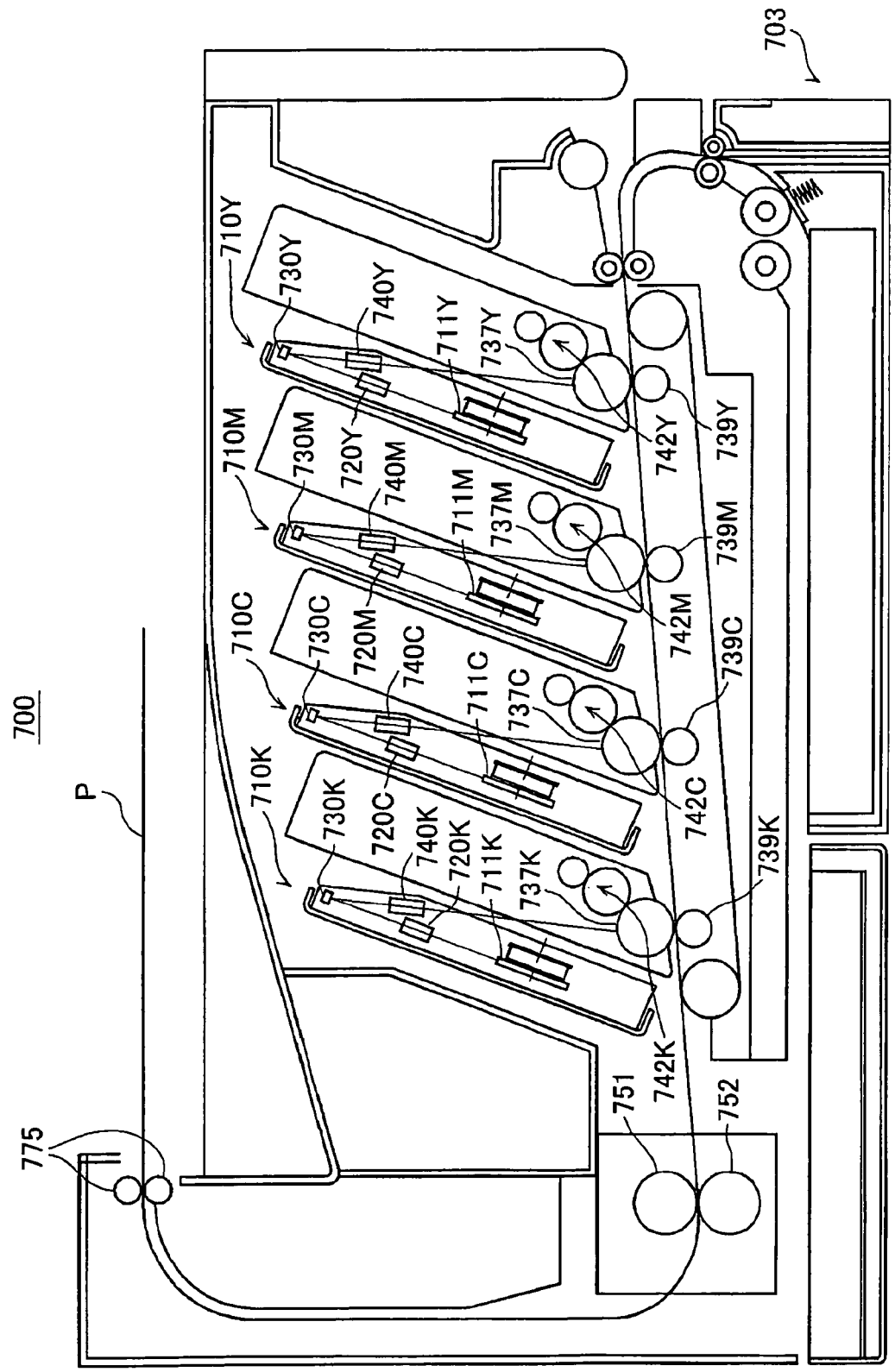
FIG. 14 is a vertical cross-sectional view illustrating another type of a color image forming apparatus.

FIG. 14 shows the construction of another type of color image forming apparatus 700. As shown in FIG. 14, the image forming apparatus 700 includes scanning units 710Y, 710M, 710C, and 710K. The scanning units 710Y through 710K include respective polygon mirrors 711Y through 711K, fθ lenses 720Y through 720K, reflecting mirrors 730Y through 730K, and cylindrical lenses 740Y through 740K. The cylindrical lenses 740Y through 740K are provided with protruding ribs described above.

The image forming apparatus 700 includes a sheet supply unit 703 for accommodating stacked sheets of paper or another recording medium. These sheets are conveyed through the image forming apparatus 700 along a conveying path P. The image forming apparatus 700 also includes photosensitive drums 737Y through 737K, developing units 742Y through 742K, and transfer rollers 739Y through 739K for each toner color. The scanning units 710Y through 710K scan laser beams over the surfaces of the photosensitive drums 737Y through 737K to form latent images thereon. The developing units 742Y through 742K develop these latent images with toner to form visible toner images.

The toner images of each color are transferred sequentially onto the recording medium as the recording medium passes between the photosensitive drums 737Y through 737K and the opposing transfer rollers 739Y through 739K, thereby forming a color image on the recording medium. A fixing unit provided downstream of the scanning units 710Y through 710K along the conveying path P includes a heating roller 751 and a pressure roller 752. The heating roller 751 and pressure roller 752 perform a fixing process to fix the color image to the recording medium. Subsequently, discharge rollers 775 discharge the recording medium from the image forming apparatus 700. The remaining structure of the image forming apparatus 700 is similar to the technology well known in the art and will not be described here in detail.

By providing ribs on each of the cylindrical lenses 740Y through 740K, which are formed of a synthetic resin, warpage can be restricted to a single direction during the molding process, thereby suppressing problems with color registration. When mounting the cylindrical lenses 740Y through 740K in the respective scanning units 710Y through 710K, the cylindrical lenses 740Y through 740K may be first mounted in mounting members having constructions described in FIGS. 12 and 13 in order to adjust the rotational positions of the lenses.

While the invention has been described in detail with reference to the specific embodiment thereof, it would be apparent to those skilled in the art that various changes and modifications may be made therein without departing from the spirit of the invention.

(1) For example, in the first embodiment described above, the laser beam reflected off the first reflecting mirror 130 then directly strikes the second reflecting mirror 131 provided on the underside surface of the planar base frame 220. This optical path is preferable for reducing the size of the scanning unit 100. However, an additional reflecting mirror may also be provided between the first reflecting mirror 130 and second reflecting mirror 131.

(2) In the first embodiment described above, the opening 222 is formed in the planar base frame 220 at the position for disposing the polygon mirror 110 and polygon motor 112, and the base plate 260 for supporting the polygon motor 112 is fastened to the underside surface of the planar base frame 220. While this construction is preferable for producing a thinner scanning unit 100, it is possible to eliminate the opening 222 and to provide a base plate for supporting the polygon motor 112 on the top surface side of the planar base frame 220.

(3) In the above-described embodiments, the polygon mirror 110, polygon motor 112, and the like were provided for scanningly deflecting the laser beam. However, other deflecting means such as a Galvano mirror may be used. In this case, the first scanning lens need not be an fθ lens but may be another lens having other optical characteristics.

(4) The construction of the mounting member 610 and the protruding position of ribs on the cylindrical lens are not limited to the second embodiment described above. For example, as shown in FIG. 15, a cylindrical lens 1540 has ribs 1540a and 1540b protruding from two locations on the same side. In this modification, warpage can be controlled to a single direction, as with the cylindrical lens 540 having a single rib 540a.

As shown in FIG. 15, the cylindrical lens 1540 may be mounted in a mounting member 620 having rail-shaped protrusions 621 through 623. Both ends of the cylindrical lens 1540 are fixed to the mounting member 620 by mounting brackets 633 in order to correct warpage in the cylindrical lens 1540. In this way, the structure of the mounting member 620 can be simplified, which is effective for producing a more compact scanning unit.

Further, in the above-described embodiments and modification, the ribs 540a, 1540a and 1540b are provided across the entire length of the scanning lens in the main scanning direction. However, the ribs need not be provided across the entire length of the scanning lens in the main scanning direction, but need only span the effective scanning range shown in FIG. 5A (the range through which the laser beam passes).

What is claimed is:

1. An image forming apparatus comprising:
   a photosensitive member that bears a latent image thereon and that defines a main scanning direction; and
   a scanning lens that transmits a light beam scanningly deflected in the main scanning direction for exposing the photosensitive member to the light beam to form the latent image thereon, the scanning lens comprising:
   a lens body formed of resin and extending substantially in the main scanning direction, the lens body defining a sub-scanning direction perpendicular to the main scanning direction and an optical-axis direction perpendicular both to the main scanning direction and to the sub-scanning direction, the lens body having opposite surfaces both being substantially perpendicular to the sub-scanning direction; and
   a rib formed integrally with the lens body and protruding in the sub-scanning direction from either one of the opposite surfaces, the rib extending over an entire effective scanning range in the main scanning direction, wherein a thickness of the rib in the optical-axis direction is less than a thickness of the lens body in the optical-axis direction within the effective scanning range.

2. The image forming apparatus according to claim 1, wherein the either one of the opposite surfaces on which the rib is formed has a planar shape.

3. The image forming apparatus according to claim 1, wherein the rib protrudes from a center part of the lens body with respect to the optical-axis direction.

4. The image forming apparatus according to claim 1, further comprising:
   a light emitting portion that emits a light beam;

a deflector that scanningly deflects the light beam in the main scanning direction; and a developing device that develops the latent image on the photosensitive member into a visible image.

5. An image forming apparatus comprising:

a photosensitive member that bears a latent image thereon and that defines a main scanning direction; and a scanning lens that transmits a light beam scanningly deflected in the main scanning direction for exposing the photosensitive member to the light beam to form the latent image thereon, the scanning lens comprising:

a lens body formed of resin and extending substantially in the main scanning direction, the lens body defining a sub-scanning direction perpendicular to the main scanning direction, the lens body having opposite surfaces both being substantially perpendicular to the sub-scanning direction; and a rib formed integrally with the lens body and protruding in the sub-scanning direction from either one of the opposite surfaces, the rib extending over a predetermined range in the main scanning direction a frame that supports the scanning lens;

a pair of fixing portions provided on the frame and fixing both ends of the scanning lens with respect to the main scanning direction;

at least one contact portion provided on the frame and contacting the scanning lens at a position other than the both ends, the rib confronting the at least one contact portion; and a pair of mounting brackets that presses, at the both ends of the scanning lens, against the surface opposite the surface on which the rib is formed and that fixes the both ends of the scanning lens to the pair of fixing portions;

wherein the pair of fixing portions and the at least one contact portion are formed of resin; and wherein protrusions are formed on the pair of fixing portions and on the at least one contact portion, the protrusions contacting at least one of the rib and the surface on which the rib is formed.

6. The image forming apparatus according to claim 5, wherein the at least one contact portion is disposed at a position opposing an approximate center part of the scanning lens with respect to the main scanning direction.

7. The image forming apparatus according to claim 5, wherein the at least one contact portion comprises a plurality of contact portions provided at positions spaced away from the pair of fixing portions; and wherein the protrusions formed at the plurality of contact portions have different heights.

8. A color image forming apparatus for forming color images on a recording medium by superposing images in a plurality of colors, the apparatus comprising:

at least one photosensitive member comprising either a plurality of separate photosensitive members or a single photosensitive member having separate regions, the at least one photosensitive member being exposed by a plurality of light beams corresponding to the plurality of colors for forming latent images either on the plurality of separate photosensitive members or on the separate regions of the single photosensitive member, the at least one photosensitive member defining a main scanning direction; and a plurality of scanning lenses each provided for a corresponding one of the plurality of colors, each scanning lens transmitting a corresponding one of the plurality of light beams scanningly deflected in the main scanning direction for exposing the at least one photosensitive member to the light beams to form the latent images thereon, each scanning lens comprising:

a lens body formed of resin and extending substantially in the main scanning direction, the lens body defining a sub-scanning direction perpendicular to the main scanning direction and an optical-axis direction perpendicular both to the main scanning direction and to the sub-scanning direction, the lens body having opposite surfaces both being substantially perpendicular to the sub-scanning direction; and a rib formed integrally with the lens body and protruding in the sub-scanning direction from either one of the opposite surfaces, the rib extending over an entire effective scanning range in the main scanning direction, wherein a thickness of the rib in the optical-axis direction is less than a thickness of the lens body in the optical-axis direction within the effective scanning range.

9. The color image forming apparatus according to claim 8, wherein the either one of the opposite surfaces on which the rib is formed has a planar shape.

10. The color image forming apparatus according to claim 8, further comprising a plurality of mounting members each mounting a corresponding one of the plurality of scanning lenses, each mounting member having a rotational shaft portion for allowing the corresponding scanning lens to be rotatably adjusted about an axis parallel to the main scanning direction.

11. The color image forming apparatus according to claim 10, wherein each mounting member comprises:

a pair of fixing portions that fixes both ends of the corresponding scanning lens with respect to the main scanning direction;

at least one contact portion that contacts the corresponding scanning lens at a position other than the both ends, the rib confronting the at least one contact portion; and a pair of mounting brackets that presses, at the both ends of the corresponding scanning lens, against the surface opposite the surface on which the rib is formed and that fixes the both ends of the corresponding scanning lens to the pair of fixing portions.

12. A scanning unit comprising:

a light emitting portion that emits a light beam;

a deflector that scanningly deflects the light beam in a main scanning direction;

a first scanning lens that converges the light beam with regard to the main scanning direction; and a second scanning lens that converges the light beam with regard to a sub-scanning direction perpendicular to the main scanning direction, the second scanning lens comprising:

a lens body formed of resin and extending substantially in the main scanning direction, the lens body having opposite surfaces both being substantially perpendicular to the sub-scanning direction and defining an optical-axis direction perpendicular both to the main scanning direction and to the sub-scanning direction; and a rib formed integrally with the lens body and protruding in the sub-scanning direction from either one of the opposite surfaces, the rib extending over an entire effective scanning range in the main scanning direction, wherein a thickness of the rib in the optical-axis direction is less than a thickness of the lens body in the optical-axis direction within the effective scanning range.

13. The scanning unit according to claim 12, wherein the either one of the opposite surfaces on which the rib is formed has a planar shape.

14. The scanning unit according to claim 12, further comprising a unit frame-on which the light emitting portion, the deflector, and the first and second scanning lenses are mounted,
   wherein the unit frame contacts at least one of the rib and the surface on which the rib is formed; and
   wherein the second scanning lens has both ends with respect to the main scanning direction, the both ends being fixed to the unit frame by pressing, toward the unit frame, the surface opposite the surface on which the rib is formed.

15. The scanning unit according to claim 12, further comprising a mounting member that mounts the second scanning lens, the mounting member having a rotational shaft portion for allowing the second scanning lens to be rotatably adjusted about an axis parallel to the main scanning direction.

16. A scanning lens comprising:
   a lens body formed of resin and extending substantially in a longitudinal direction, the lens body defining a height direction perpendicular to the longitudinal direction and a depth direction perpendicular both to the height direction and the longitudinal direction, the lens body having opposite surfaces both being substantially perpendicular to the height direction; and
   a rib formed integrally with the lens body and protruding in the height direction from either one of the opposite surfaces, the rib extending over an entire effective scanning range in the longitudinal direction, wherein a thickness of the rib in the depth direction is less than a thickness of the lens body in the depth direction within the effective scanning range.

17. The scanning lens according to claim 16, wherein the either one of the opposite surfaces on which the rib is formed has a planar shape.

* * * * *